United States Patent
Lee et al.

(10) Patent No.: US 11,070,269 B2
(45) Date of Patent: Jul. 20, 2021

(54) METHOD AND APPARATUS FOR TRANSMITTING OR RECEIVING SIGNALS IN WIRELESS COMMUNICATION SYSTEM

(71) Applicants: Samsung Electronics Co., Ltd., Suwon-si (KR); Seoul National University R&DB Foundation, Seoul (KR)

(72) Inventors: Jaehyun Lee, Suwon-si (KR); Kwonjong Lee, Suwon-si (KR); Hyojin Lee, Suwon-si (KR); Jungsuek Oh, Seoul (KR); Hogyeom Kim, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 2 days.

(21) Appl. No.: 16/944,017

(22) Filed: Jul. 30, 2020

(65) Prior Publication Data

US 2021/0036753 A1 Feb. 4, 2021

Related U.S. Application Data

(60) Provisional application No. 62/881,860, filed on Aug. 1, 2019.

(30) Foreign Application Priority Data

Jul. 13, 2020 (KR) .......................... 10-2020-0086441

(51) Int. Cl.
*H04B 7/06* (2006.01)

(52) U.S. Cl.
CPC .................................. *H04B 7/0617* (2013.01)

(58) Field of Classification Search
CPC ..................................................... H04B 7/0617
(Continued)

(56) References Cited

U.S. PATENT DOCUMENTS 8,350,759 B2   1/2013  Ju et al.
8,912,973 B2  12/2014  Werner et al.
(Continued)

FOREIGN PATENT DOCUMENTS

KR   10-0994129 B1   11/2010
WO   2006/023195 A2   3/2006
(Continued)

OTHER PUBLICATIONS

Li et al., "Miniaturized Metasurface Unit Cell for Microwave Metalens Antennas", IEEE, 2017, 4 pages.
(Continued)

*Primary Examiner* — Fitwi Y Hailegiorgis

(57) ABSTRACT

Provided are a method and apparatus for transmitting or receiving signals in a wireless communication system. An electronic device in the wireless communication system includes: a transceiver; and at least one processor, wherein the transceiver comprises an antenna module and a metasurface module, wherein the antenna module comprises a plurality of antennas, wherein the at least one processor is configured to generate first beams for the plurality of antennas, transmit the first beams to the metasurface module from the plurality of antennas, generate second beams based on the first beams through the metasurface module, and transmit the second beams to another electronic device, and wherein the metasurface module is arranged to receive the first beams generated for the plurality of antennas.

16 Claims, 23 Drawing Sheets

(58) Field of Classification Search
USPC .......................................................... 375/267
See application file for complete search history.

(56) References Cited

U.S. PATENT DOCUMENTS

| | | | |
|---|---|---|---|
| 9,246,218 B2 | 1/2016 | Britz et al. | |
| 2011/0199273 A1 | 8/2011 | Kim et al. | |
| 2018/0239021 A1* | 8/2018 | Akselrod | B29D 11/00346 |
| 2021/0013953 A1* | 1/2021 | Hormis | H04B 7/0897 |

FOREIGN PATENT DOCUMENTS

| | | |
|---|---|---|
| WO | 2016/049629 A1 | 3/2016 |
| WO | 2016/140720 A2 | 9/2016 |

OTHER PUBLICATIONS

Li et al., "Design of high-gain lens antenna based on phase-gradient metasurface", IEEE, 2016, 4 pages.

Li et al., "X-Band Phase-Gradient Metasurface for High-Gain Lens Antenna Application", IEEE Transactions on Antennas and Propagation, vol. 63, No. 11, Nov. 2015, 6 pages.

Zhang et al., "Beam-Shaping Technique Based on Generalized Laws of Refraction and Reflection", IEEE Transactions on Antennas and Propagation, vol. 66, No. 2, Feb. 2018, 9 pages.

Jiang et al., "Broadband High Directivity Multibeam Emission Through Transformation Optics-Enabled Metamaterial Lenses", IEEE Transactions on Antennas and Propagation, vol. 60, No. 11, Nov. 2012, 12 pages.

Guo et al., "Design of anisotropic focusing metasurface and its application for high-gain lens antenna", Journal of Physics D: Applied Physics, Jan. 31, 2017, 10 pages.

Chen et al., "A Huygens' Metasurface Lens for Enhancing the Gain of Frequency-Scanned Slotted Waveguide Antennas", 2018 United States National Committee of URSI National Radio Science Meeting, Jan. 4-7, 2018, 2 pages.

Erfani et al., "A High-Gain Broadband Gradient Refractive Index Metasurface Lens Antenna", IEEE Transactions on Antennas and Propagation, vol. 64, No. 5, May 2016, 6 pages.

Delos, "Advanced Technologies Pave the Way for New Phased Array Radar Architectures", Analog Devices, 2016, 4 pages.

* cited by examiner

FIG. 4
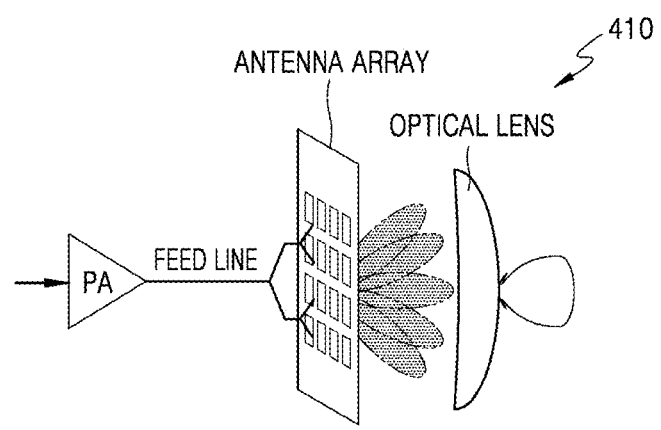
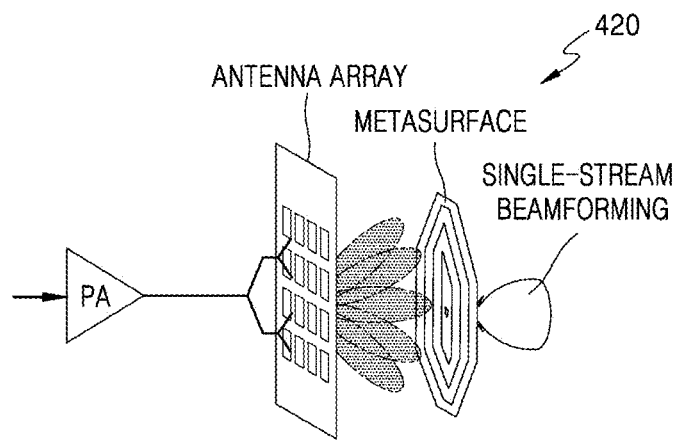

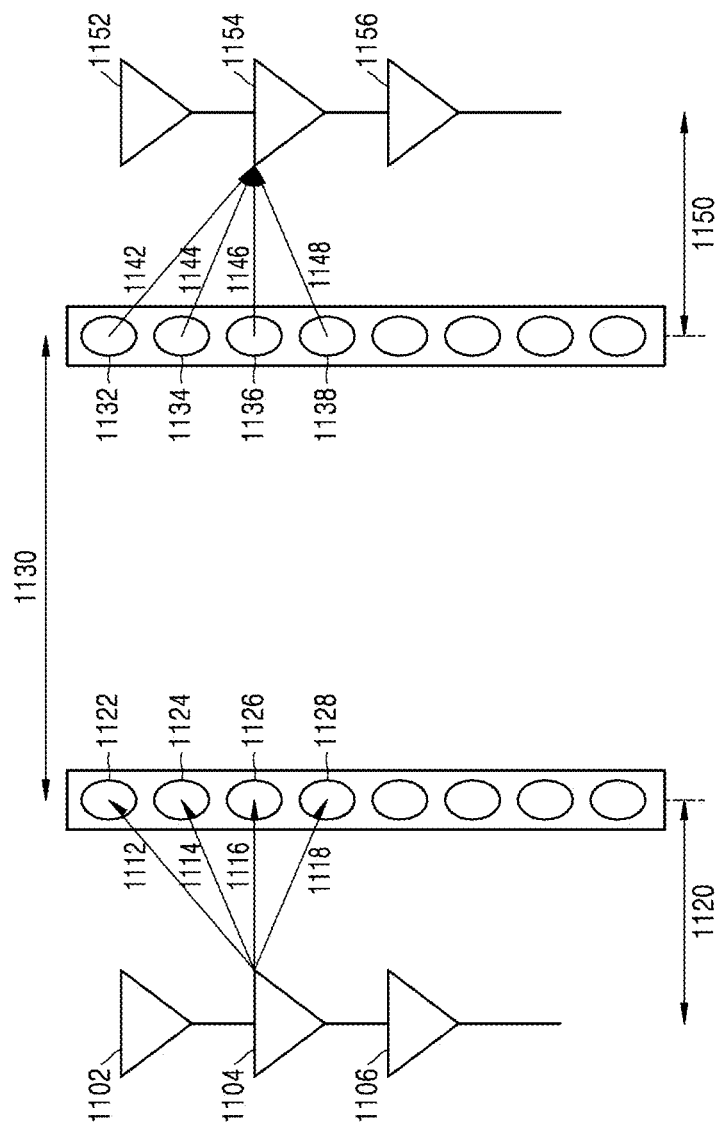

METHOD AND APPARATUS FOR TRANSMITTING OR RECEIVING SIGNALS IN WIRELESS COMMUNICATION SYSTEM

CROSS-REFERENCE TO RELATED APPLICATION

This application is based on and claims the benefit of U.S. Provisional Patent Application No. 62/881,860 filed on Aug. 1, 2019 in the United States Patent and Trademark Office, and claims priority under 35 U.S.C. § 119 to Korean Patent Application No. 10-2020-0086441 filed on Jul. 13, 2020 in the Korean Intellectual Property Office, the disclosures of which are incorporated herein by reference in their entirety.

BACKGROUND

1. Field

The disclosure relates to a method and apparatus for transmitting or receiving signals in a wireless communication system.

2. Description of Related Art

The $6^{th}$ generation (6G) mobile communication system beyond the $5^{th}$ generation (5G) may use ultrahigh frequency bands such as millimeter wave bands or Terahertz bands to overcome insufficient bandwidth. In the ultrahigh frequency band, there are large path losses of radio waves and the amount of radio waves reflected or transmitted may drastically drop, compared to the frequencies for the previous mobile communication (e.g., sub-6 GHz frequencies such as the ultra high frequency (UHF), very high frequency (VHF) bands, etc.). To mitigate the path loss of radio waves and increase a range for radio wave reception, a beamforming scheme using multiple antennas may be used. A terminal or a base station may steer the beam to a particular direction using analog and digital signal processing schemes in addition to using the multiple antennas. However, in order to control the steering angle of the beam, additional high frequency signal processing components such as a phase shifter, a power amplifier, and a mixer are required. As the high frequency signal processing components themselves consume power, the more there are the high frequency signal processing components for each antenna, the more additional energy is consumed for beamforming and beam steering. Hence, studies on metamaterials are underway.

SUMMARY

The disclosure provides an apparatus and method for effectively transmitting or receiving signals in a wireless communication system.

Additional aspects will be set forth in part in the description which follows and, in part, will be apparent from the description, or may be learned by practice of the presented embodiments of the disclosure.

According to an embodiment of the disclosure, an electronic device in a wireless communication system includes: a transceiver; and at least one processor, wherein the transceiver includes an antenna module and a metasurface module, wherein the antenna module includes a plurality of antennas, wherein the at least one processor is configured to generate first beams for the plurality of antennas, transmit the first beams to the metasurface module from the plurality of antennas, generate second beams based on the first beams through the metasurface module, and transmit the second beams to another electronic device, and wherein the metasurface module is arranged to receive the first beams generated for the plurality of antennas.

According to another embodiment of the disclosure, an operating method of an electronic device in a wireless communication system includes: generating first beams for a plurality of antennas; transmitting the first beams to a metasurface module from the plurality of antennas; generating second beams based on the first beams through the metasurface module; and transmitting the second beams to another electronic device, wherein the metasurface module may be arranged to receive the first beams generated for the plurality of antennas.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates an example of an optical-lens based radio frequency (RF) front-end structure and a single-layer metasurface RF front-end structure;

FIG. 11 illustrates a system including a meta channel, according to an embodiment of the disclosure;

DETAILED DESCRIPTION

Figure 1:
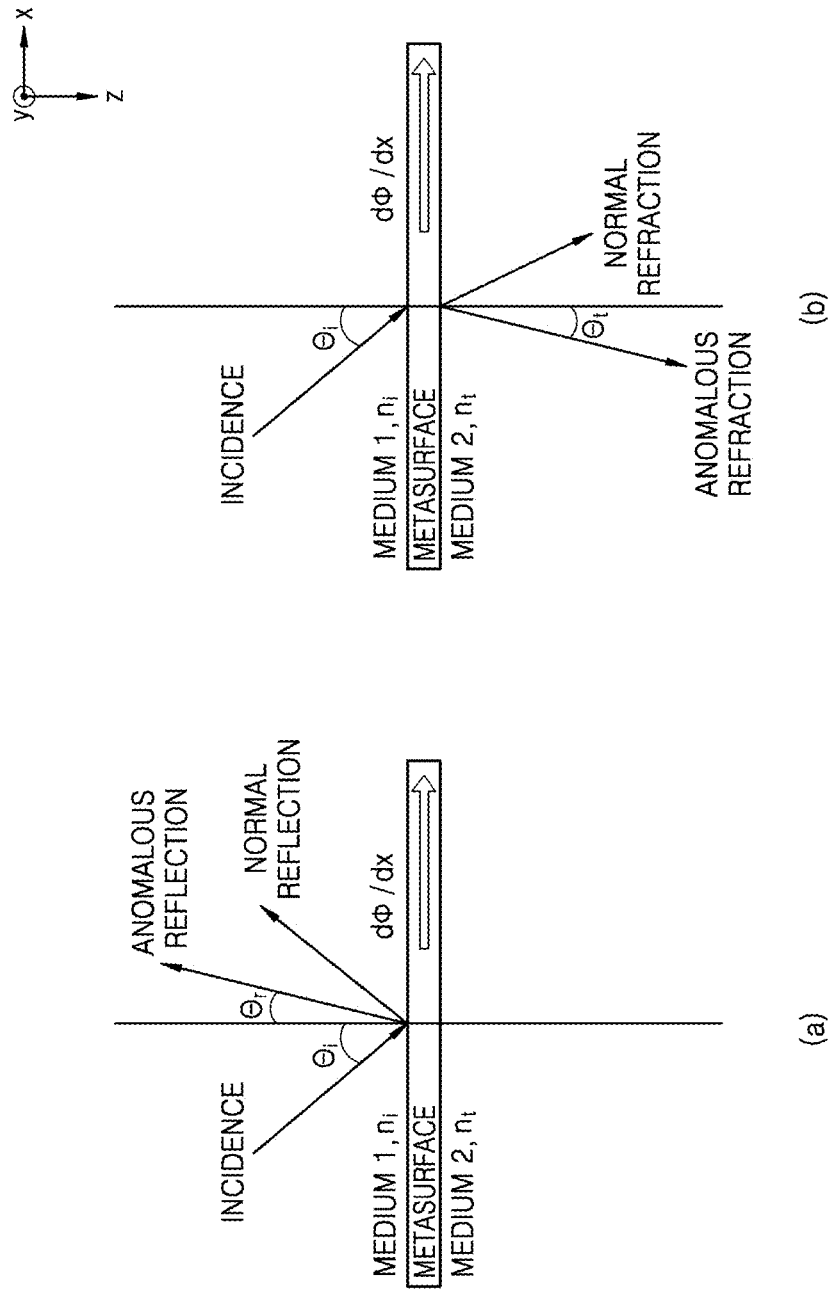
FIG. 1 illustrates examples of reflection and refraction related to a metasurface.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described in detail with reference to accompanying drawings. In the description of the disclosure, when it is determined that a detailed description of associated commonly-used technologies or structures may unnecessarily obscure the subject matter of the disclosure, the detailed description will be omitted. Further, terms, as will be mentioned later, are defined by taking functionalities in the disclosure into account, but may vary depending on practices or intentions of users or operators. Accordingly, the terms should be defined based on the descriptions throughout this specification.

Advantages and features of the disclosure, and methods for attaining them will be understood more clearly with reference to the following embodiments, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

Throughout the disclosure, the expression "at least one of a, b or c" indicates only a, only b, only c, both a and b, both a and c, both b and c, all of a, b, and c, or variations thereof.

A terminal may include a user equipment (UE), a mobile station (MS), a cellular phone, a smart phone, a computer, or a multimedia system capable of performing a communication function.

In the disclosure, a controller may also be referred to as a processor.

In the disclosure, a layer (or a layer apparatus) may also be referred to as an entity.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a greater number of components and modules. Moreover, the components and modules may be implemented to execute one or more central processing units (CPUs) in a device or security multimedia card. In embodiments of the disclosure, the module may include one or more processors.

Descriptions of some well-known technologies that possibly obscure the disclosure will be omitted, if necessary. Embodiments of the disclosure will now be described with reference to accompanying drawings.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

In the following description, a physical channel and a signal may be interchangeably used with data or a control signal. For example, a physical downlink shared channel (PDSCH) is a term to refer to a physical channel on which to transmit data, but may also be used to refer to data. In other words, in this specification, an expression "transmit a physical channel" may be equally interpreted as an expression "transmit data or a signal on a physical channel".

Throughout the specification, higher signaling refers to a method of transferring a signal to a UE from a BS on a downlink data channel of a physical layer or to the BS from the UE on an uplink data channel of the physical layer. The higher signaling may be understood as radio resource control (RRC) signaling or a media access control (MAC) control element (CE).

In the following description, for convenience of explanation, some of the terms and names defined by the $3^{rd}$ generation partnership project new radio (3GPP NR) will be used. The disclosure is not, however, limited to the terms and definitions, and may equally apply to any systems that conform to other standards. In the disclosure, a gNode B (gNB) may be interchangeably used with an eNode B (eNB). For example, a base station referred to as an eNB may also indicate a gNB. Furthermore, the term 'terminal' or 'UE' may refer not only to a cell phone, a machine-type communication (MTC) device, a narrowband Internet of Things (NB-IoT) device, and a sensor but also to other wireless communication devices.

In the following description, a base station is an entity for performing resource allocation for a terminal, and may be at least one of a gNB, an eNB, a Node B, a BS, a radio access unit, a base station controller (BSC), or a network node. A terminal may include a UE, an MS, a cellular phone, a smart phone, a computer, or a multimedia system capable of performing a communication function. Obviously, the disclosure is not limited thereto.

In order to meet a demand for soaring data rates, generations of wireless communications systems are shifting from microwave bands and millimeter wave (mmWave) bands to higher operating frequency bands such as teraherz (THz) bands. The 3GPP includes 24, 26, 28, and 39 GHz bands for 5G NR specifications, which are not considered in the fourth generation (4G) long term evolution (LTE) system. In the THz band expanding to 0.1 THz to 10 THz, in particular, there is a possibility to excavate about 200 GHz more bandwidth. As a result, these high frequency bands are attracting several companies in wireless communication fields.

Despite obvious advantages of the high frequencies, there are some issues to be solved to use these high frequencies in cellular networks as compared to the current bands, and the issues are as follows:

1) Inefficient RF components: the THz band has long been under-utilized because efficient RF components may not be used in the THz band. In particular, in developing a power amplifier (PA), processing technologies of semiconductors such as complementary metal oxide semiconductors (CMOSs) and SiGe may not have been able to provide a sufficient gain and efficiency. A so-called THz band gap has been created because substantial RF components targeted for a THz band between microwave and infrared regions have not been provided.

2) High losses in RF transmission lines: transmission lines are required to exchange RF signals between RF components and antenna elements in order to radiate or receive signals in typical transceivers. The higher the frequency, the shorter the wavelength and the more energy may be dissipated by the transmission lines. When there is not a new design of a transmission line for the THz band, the antenna elements may not be able to receive enough power to radiate signals to manage a link budget.

3) High propagation attenuation: electromagnetic waves having high frequencies may have free space path loss (FSPL) inversely proportional to the square of the frequency. When a THz frequency of 180 GHz is compared with an operating frequency of 1.8 GHz, the FSPL may be 40 dB higher than the LTE band, which may mean about 10,000 times more serious attenuation. Environmental attenuation related to operation at high frequencies may increase as well. For example, attenuation due to atmosphere absorption of 60 GHz waves may be 10 dB/km or more, and attenuation for 700 MHz waves may be about 0.01 dB/km. Such high attenuation of electromagnetic waves may be regarded as one of major obstacles to substantialize a THz communication system.

To overcome the aforementioned problems and fully utilize a high frequency spectrum, high-efficient transmitter (TX) and receiver (RX) need to be developed. Hence, there have been several attempts to utilize metamaterials, which are artificial substances having micro- or nano-scale structures enabled to control electromagnetic waves in a desired manner.

An electromagnetically invisible cloak has been first implemented with a metamaterial designed over a microfrequency band. Furthermore, a planar metamaterial having Jerusalem cross-shaped unit cells was introduced to design a high gain and low profile lens antenna using a phase-gradient metamaterial. Moreover, a beamforming technology was introduced based on the use of a metamaterial having phase shift structures (PSSs) designed to reshape a primary beam to a desired beam. Beam may be regarded as a set of ray tubes, and refraction characteristics of the beam may be modified by the PSSs based on a generalized refraction law to form a desired shape of beam. High-gain directive beam patterns and beam directivity of a metamaterial have been studied as well. A study on a metamaterial lens design, to which Huygens' principle is applied, to be able to attain a desired lens effect while minimizing reflection and keeping low profiles has also been conducted.

The aforementioned existing metamaterial technology shows that radiation from an embedded omnidirectonal source may be converted into any desired number of highly directive beams directed to any directions. In particular, a metasurface in a planar metamaterial structure having unit cells such as split ring resonators or V-shaped antennas may control wave propagation by refracting incident waves having less reflection or absorption loss.

Studies on the metasurface have been focused on how much beamforming gain may be attained in a single-layer transmission scenario. However, these studies have not taken into account efficiency or an influence on a baseband system design of a multi-input multi-output (MIMO) operation. From this perspective, the disclosure proposes a new metasurface RF front-end design that enables a MIMO operation using a metasurface. Specifically, a well-designed large aperture metasurface according to the disclosure shows that a significant beamforming gain may be attained not only for a single feed antenna located on a focal point but also other feed antennas properly located on non-focal points.

In addition, a high system capacity and beamforming gain may be attained by properly utilizing the metasurface and antenna arrays through an RF front-end design proposed in the disclosure. Accordingly, a new RF front-end design using the metasurface of the disclosure may be used for the future sixth generation (6G) wireless communication. When the RF front-end design of the disclosure is introduced, a problem related to device efficiency in the high frequency band may be mitigated. A metamaterial applicable to embodiments of the disclosure will now be described.

In the disclosure, a metamaterial may refer to a material made to induce a particular electromagnetic property due to geometrical characteristics of materials arranged in an artificial structure. Furthermore, a metasurface may generally refer to a substance with the metamaterial made in a two dimension (2D) planar structure. In communication systems, the metasurface is being studied as an element of a lens antenna. Specifically, the metasurface may create differences in phase to radio waves entering into unit cells of the metasurface by regularly or irregularly arranging the unit cells each within a distance shorter than a wavelength of the radio wave emanating from the antenna in a plane form. The metasurface may re-radiate the radio waves that have entered into the unit cells of the metasurface using phase differences. When the unit cells are designed and arranged in proper positions, a beamforming function to concentrate the radio waves emanating from the antenna may be used and a beam steering angle may be controlled. When a structure of the surface of a metamaterial that focuses the radio waves emanating from a particular antenna using the metasurface is designed, it may be used as an apparatus for mitigating the path loss of the radio waves in a high frequency band. The apparatus for mitigating the path loss of radio waves in the high frequency band using the surface of the matamaterial in the disclosure may be referred to as a metasurface, a metamaterial lens, or a metasurface lens. Hereinafter, it will be referred to as a metasurface. When the metasurface is used with an antenna, a higher beam gain may be attained than when the antenna is only used.

The metamaterial refers to an artificial substance having a micro- or nano-scale structure able to control electromagnetic (EM) waves in a desired manner. The EM waves incident on the metasurface in a planar metamaterial structure may undergo different phase shifts depending on sub-wavelength-scale unit cells. The phase shifts on a well-designed metasurface may lead to unprecedented beamforming gains. However, MIMO operation schemes using the metasurface have not yet been discussed.

Hence, the disclosure proposes an RF front-end structure related to the MIMO operation scheme using the metasurface. When the RF front-end structure according to the disclosure is used, not only the beamforming gain but also a system capacity may be increased due to the metasurface. Furthermore, the metasurface according to the disclosure may facilitate MIMO operation in a high frequency band for 6G wireless communication. A principle of the metasurface according to the disclosure will now be described in connection with FIGS. 1 and 2.

FIG. 1 illustrates examples of reflection and refraction related to a metasurface.

Referring to FIG. 1, a concept of the metasurface may be expressed by laws of reflection and refraction. For example, in (a) of FIG. 1, in a case of a law of refraction applicable to the metasurface, it may be assumed that the one dimensional (1D) metasufrace has negligible thickness equal to or less than a threshold along the z-axis, and unit cells of the metasurface have phase discontinuity of $d\phi(x)/dx$ along the x-axis. For example, in FIG. 1, relations between respective parameters according to the law of refraction of the metasurface are expressed in the following equation 1:

$$\sin(\theta_t)n_t - \sin(\theta_i)n_i = \frac{\lambda}{2\pi} \frac{d\phi(x)}{dx} \qquad \text{[Equation 1]}$$

In the equation 1, $\theta_t$, $\theta_i$, $n_t$, and $n_i$ may refer to angles and refraction ratios in transmitted and incident mediums. For example, $\theta_t$ may refer to a transmitted angle or a refraction angle for anomalous refraction of EM waves propagating from the metasurface to medium 2, and $\theta_i$ may refer to an incidence angle of EM waves propagating from medium 1 to the metasurface. $n_t$ may refer to a refraction ratio of the medium 2, and $n_i$ may refer to a refraction ratio of the medium 1. $\lambda$ may refer to the wavelength. When there is no phase discontinuity introduced by the metasurface (i.e., $d\phi(x)/dx=0$), the equation 1 may correspond to the Snell's law of geometric optics. The equation 1 may imply that the refracted waves may have any directivity $\theta_t$. Furthermore, a phase discontinuous gradient may be properly implemented along an interface as shown in FIG. 1. Also, referring to (b) of FIG. 1, anomalous reflection may occur to the incidence of the EM waves propagating from the medium 1 to the metasurface.

A discrete phase discontinuity metasurface composed of single- or multilayer planar metamaterials may be implemented by periodically printing sub-wavelength metal unit cells on a substrate. Each of the unit cells of the metasurface may receive incident EM waves from a feed antenna element, and subsequently radiate phase-delayed EM waves.

According to the Huygens-Fresnel principle, equiphase wave fronts may be created by constructively combined phase-delayed spherical waves coming out of the unit cells.

By designing a metasurface emanating the equiphase wave fronts such as so-called plane waves, the amplitude of the waves is preserved along the propagation direction, thereby attaining a high beamforming gain.

Figure 2:
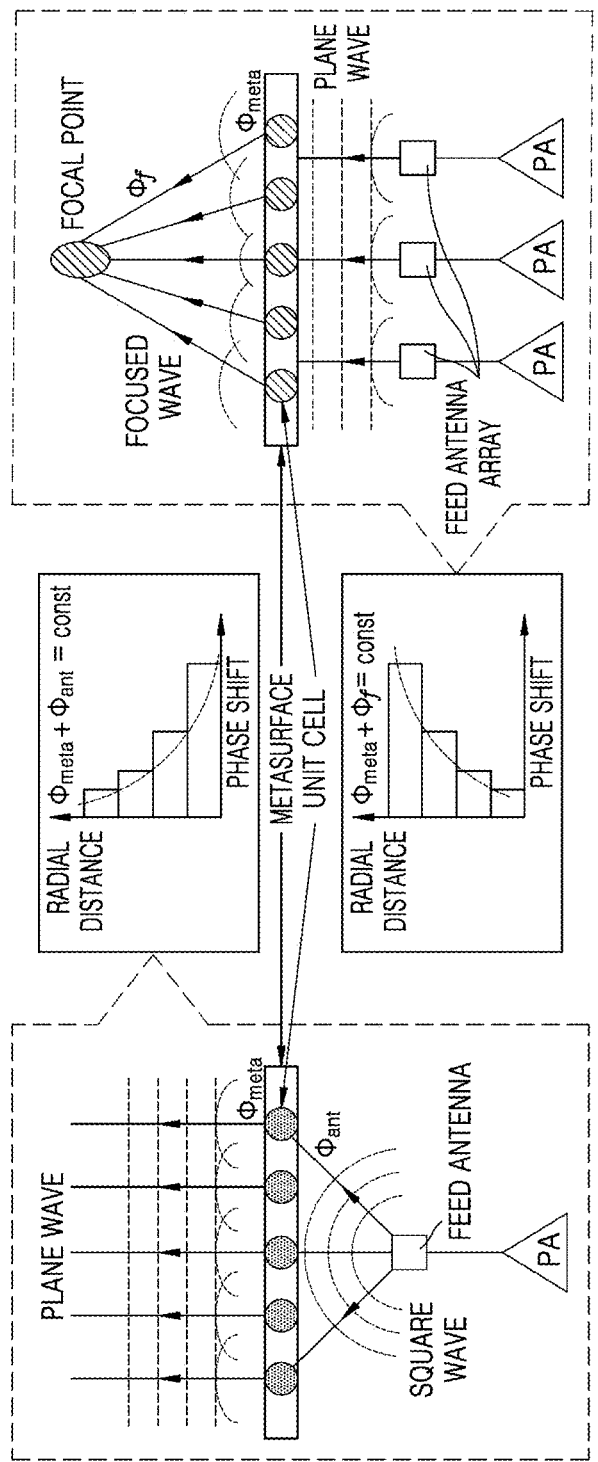
FIG. 2 illustrates two applications of a metasurface.

FIG. 2 illustrates two applications of a metasurface.

Referring to FIG. 2, a drawing on the left represents that spherical waves emitted from a feed antenna may be re-arranged by the metasurface into directive plane waves. This beam controllability may be attributed to unit cells with different phase offsets depending on a radial distance from the antenna to a focal axis passing through the center of the metasurface.

A drawing on the right of FIG. 2 represents a reverse phenomenon to the case of the plane wave generated from the feed antenna array. For example, the metasurface on the right drawing may generate concentrated EM waves by adopting opposite phase offsets to those in the left drawing. In order to mitigate intrinsic attenuation in the high frequency band, case studies may be conducted from dispersive spherical waves to concentrated plane waves to utilize improvement in amplitude of collimated waves. Furthermore, in FIG. 2, graphs representing radial distances according to phase shifts are shown for left and right drawings.

Figure 3:
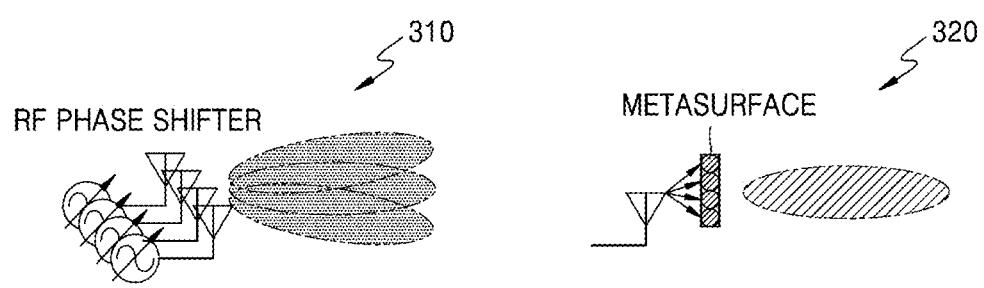
FIG. 3 illustrates an example of phased array beamforming and metasurface beamforming.

FIG. 3 illustrates an example of phased array beamforming and metasurface beamforming.

Referring to FIG. 3, phased array beamforming 310 and metasurface beamforming 320 are illustrated. The phased array beamforming 310 may perform analog beamforming. For example, with phase control between a plurality of RF phase shifters, beam directions may be controlled. MIMO operation may be enabled in the phased array beamforming 310. Accordingly, a spatial multiplexing gain may be attained. For the phased array beamforming, however, the RF front-end structure may be complicated due to the plurality of RF phase shifters, and large power may be consumed to operate the RF phase shifters. That is, power consumption occurs in every antenna element. Hence, the phased array beamforming 310 may cause RF loss when beam steering is performed using the RF phase shifters.

The metasurface beamforming 320 has an advantage that beamforming may be performed through a single antenna element. However, with traditional metasurface beamforming, beam steering may not be enabled and no MIMO gain may be attained. In order to address the problems, the disclosure proposes a metasurface RF front-end structure that enables beam steering and efficiently attains a MIMO gain. A difference between an optical lens or a metasurface structure having a single layer and a multilayer metasurface structure proposed in the disclosure will now be described in connection with FIGS. 4 and 5.

FIG. 4 illustrates an example of an optical-lens based RF front-end structure and a single-layer metasurface RF front-end structure.

Referring to FIG. 4, an example of an optical-lens based RF front-end structure 410 and an example of a single layer metasurface RF front-end structure 420 are shown.

In FIG. 4, the optical-lens based RF front-end structure 410 may include a feed line connecting a power amplifier (PA) to an antenna array, the antenna array, and an optical lens. Furthermore, the optical-lens based RF front-end structure 410 may include an optical lens antenna capable of focusing EM waves on a designated point. The optical-lens based RF front-end structure 410 has disadvantages that it is bulky and non-flat because the optical lens requires a focal distance between the antenna and the lens and thickness as thick as to refract rays.

In FIG. 4, the single layer metasurface RF front-end structure 420 may include a PA, an antenna array, and a metasurface. The single layer metasurface RF front-end structure 420 represents a metasurface-antenna pair. As the metasurface has a focal distance shorter than the optical lens, the metasurface may be arranged to be close to the antenna array as compared with the optical lens. However, in the single layer metasurface RF front-end structure 420 of FIG. 4, only one data stream may be transmitted for one metasurface-antenna pair, making it impossible to attain the spatial multiplexing gain of a MIMO system. Accordingly, in order to overcome the disadvantages of the optical-lens based RF front-end structure 410 and the single layer metasurface RF front-end structure 420, the disclosure proposes a multilayer metasurface RF front-end structure as shown in FIG. 5.

Figure 5:
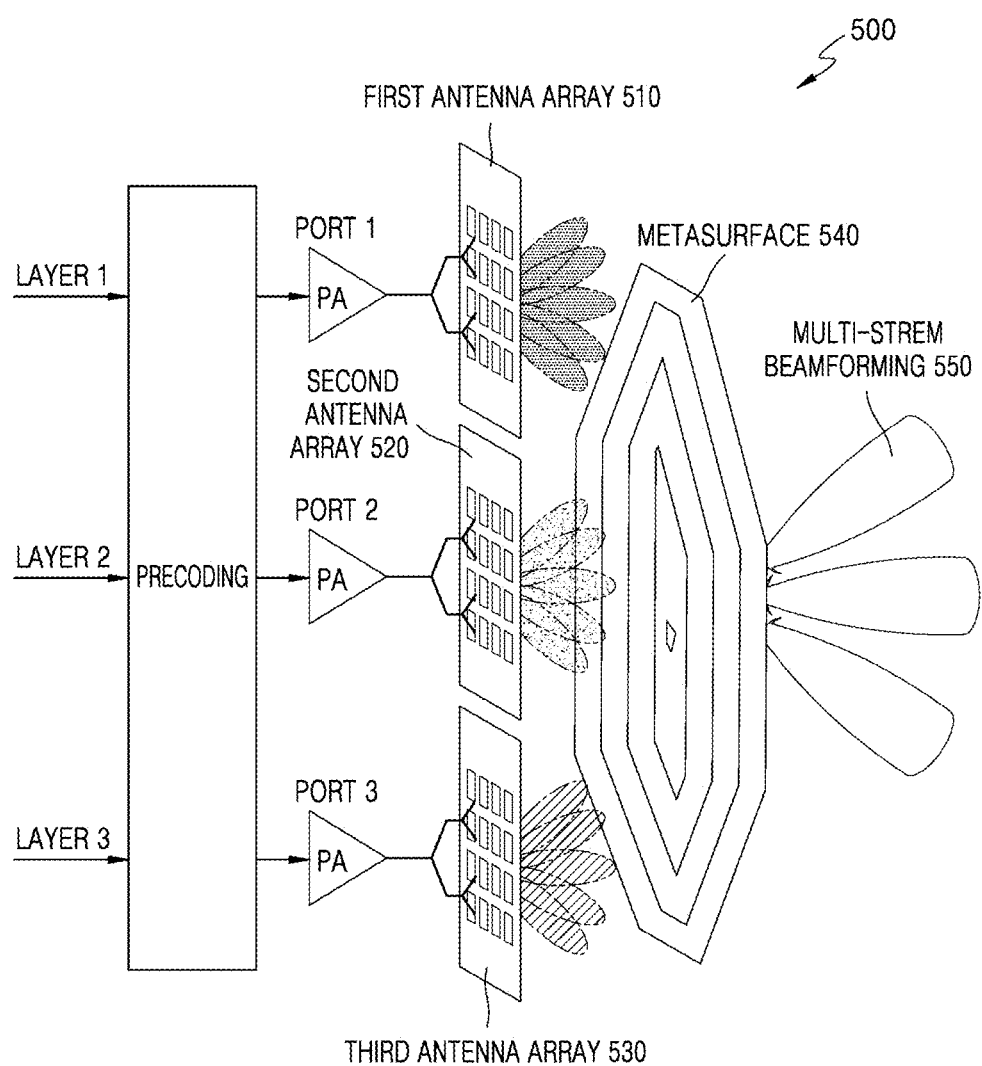
FIG. 5 illustrates a multilayer metasurface RF front-end structure, according to an embodiment of the disclosure.

FIG. 5 illustrates a multilayer metasurface RF front-end structure, according to an embodiment of the disclosure.

Referring to FIG. 5, a system of a multi-layer metasurface RF front-end structure 500 may be referred to as a MIMO metasurface RF front-end system. The MIMO metasurface RF front-end system may include multi-feed antennas and a large-aperture metasurface to refract all waves to a designated direction. Specifically, in FIG. 5, the multilayer metasurface RF front-end structure 500 may include a first antenna array 510, a second antenna array 520, and a third antenna array 530 for performing precoding on each layer (e.g., layer 1, layer 2, and layer 3) and receiving signals whose power is amplified by a PA of each port (e.g., port 1, port 2, or port 3), and a metasurface 540 capable of receiving beams emanating from the first antenna array 510, the second antenna array 520, and the third antenna array 530. The metasurface 540 may form beams of a certain direction using the beams emanating from the first antenna array 510, the second antenna array 520, and the third antenna array 530. That is, multi-stream beamforming 550 may be performed through the metasurface 540. In an embodiment of the disclosure, it may be regarded that a data stream is formed for each layer. In other words, three data streams may be formed for the three layers.

The multilayer metasurface RF front-end structure 500 shown in FIG. 5 may have advantages as follows compared to the optical lens based RF front-end structure 410 and the single layer metasurface RF front-end structure 420: 1) capability of MIMO operation; 2) a higher beamforming gain through the large aperture; 3) capability of beam steering; and 4) a small form factor compared with the optical lens antenna.

The studies on the metasurface are just focused on the beamforming gain of the single antenna-single lens pair, but in an embodiment of the disclosure, a multi-antenna single metasurface structure is proposed to attain improvement in both the beamforming gain and the system capacity.

To describe an RF front-end design proposed in the disclosure, geometry and parameters may be set as in Table 1. The parameters may be classified into three groups as in Table 1. For example, the three groups may respectively include general parameters, feed antenna related parameters, and metasurface related parameters.

TABLE 1

| Group | Symbol | Description | Unit |
| --- | --- | --- | --- |
| General parameters | f | Frequency | Hz |
| | λ | Wavelength | m |
| | r | Antenna to metasurface distance | m |

TABLE 1-continued

| Group | Symbol | Description | Unit |
|---|---|---|---|
| | H | Channel matrix | — |
| | N, n | The number/index of multipath | — |
| | M | The number of sub-paths | — |
| | $\sigma_{BS}$ | Base station (BS) angular spread | — |
| | $\sigma_{MS}$ | Mobile station (MS) angular spread | — |
| | $\phi$ | Angle of departure | deg |
| | $\psi$ | Angle of arrival | deg |
| | $k_0$ | Wavenumber | — |
| Feed Antenna | U, u | The number/index of Rx Antenna | — |
| | S, s | The number/index of Tx Antenna | — |
| | $d_{BS}$ | The distance between BS antenna array | $\lambda$ |
| | $d_{MS}$ | The distance between MS antenna array | $\lambda$ |
| | $F_S(\phi)$ | Radiation Pattern of Tx Antenna | dB |
| | $F_u(\psi)$ | Radiation Pattern of Rx Antenna | dB |
| Meta-surface | U', u' | The number/index of Rx meta elements | — |
| | S', s' | The number/index of Tx meta elements | — |
| | $N_{meta}$ | The number of meta element | — |
| | $d_{meta}$ | The distance between meta element | m |
| | $F_S'(\phi)$ | Radiation Pattern of Tx meta element | dB |
| | $F_u'(\psi)$ | Radiation Pattern of Rx meta element | dB |

Referring to Table 1, of the general parameters, f may refer to a frequency. $\lambda$ may refer to a wavelength. r may refer to a distance from an antenna to the metasurface. H may refer to a channel matrix. N, n may refer to the number/indexes of multipaths. M may refer to the number of sub-paths. $\sigma_{BS}$ may refer to BS angular spread. $\sigma_{MS}$ may refer to MS angular spread. $\phi$ may refer to an angle of departure (AoD), and $\psi$ may refer to an angle of arrival (AoA). $k_0$ may refer to a wavenumber.

Of the feed antenna related parameters, U, u may refer to the number/indexes of receive antennas. S, s may refer to the number/indexes of transmit antennas. $d_{BS}$ may refer to a distance between BS antenna arrays. $d_{MS}$ may refer to a distance between MS antenna arrays. $F_S(\phi)$ may refer to a radiation pattern of a transmit (TX) antenna. $F_u(\psi)$ may refer to a radiation pattern of a receive (RX) antenna.

Of the metasurface related parameters, U', u' may refer to the number/indexes of RX meta elements. S', s' may refer to the number/indexes of TX meta elements. $N_{meta}$ may refer to the number of meta elements. $d_{meta}$ may refer to a distance between meta elements. $F_S'(\phi)$ may refer to a radiation pattern of a TX meta element. $F_u'(\psi)$ may refer to a radiation pattern of an RX meta element.

For geometric convenience, a 2D spatial channel for the antenna array and the metasurface may be considered. Alternatively, the spatial channel for the antenna array and the metasurface may be extended into 3D.

Figure 6:
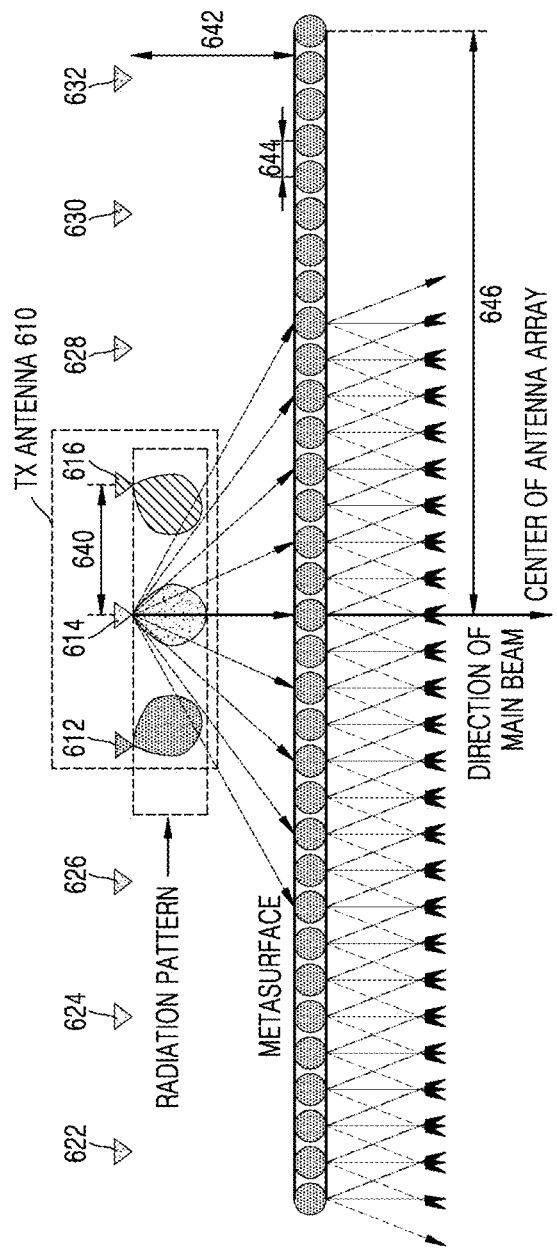
FIG. 6 illustrates a detailed multilayer metasurface RF front-end structure, according to an embodiment of the disclosure.

FIG. 6 illustrates a detailed multilayer metasurface RF front-end structure, according to an embodiment of the disclosure.

Referring to FIG. 6, the multilayer metasurface RF front-end structure may include TX antennas 610, and in the embodiment of the disclosure shown in FIG. 6, the TX antennas 610 may include three TX antennas, e.g., a first antenna 612, a second antenna 614, and a third antenna 616. The three antennas may each form a radiation pattern. Based on the radiation pattern for each antenna, a direction of a main beam may be determined. Although there are three TX antennas 610 shown in FIG. 6, the number of the TX antennas 610 is not limited thereto. In an embodiment of the disclosure, the first antenna 612, the second antenna 614, and the third antenna 616 of FIG. 6 may correspond to the first antenna array 510, the second antenna array 520, and the third antenna array 530, respectively.

In an embodiment of the disclosure, the multilayer metasurface RF front-end structure may further include multiple TX antennas. For example, the multilayer metasurface RF front-end structure of FIG. 6 may further include a fourth antenna 622, a fifth antenna 624, a sixth antenna 626, a seventh antenna 628, an eighth antenna 630, and a ninth antenna 632. Each TX antenna may include one or more antenna elements.

In an embodiment of the disclosure, the TX antennas 610 may be arranged with a gap 640 between them. The TX antennas 610 and the metasurface may be arranged with a gap 642 between the TX antennas 610 and the metasurface. The metasurface may include a plurality of unit cells. The plurality of unit cells may be arranged with a gap 644 between them. In an embodiment of the disclosure, the gap 644 between the plurality of unit cells may be determined based on the gap 640 between the TX antennas 610 or the gap 642 between the TX antennas 610 and the metasurface. With respect to the center of the antenna array, the metasurface may be positioned symmetrically. For example, a distance 646 from the center of the antenna array to one end of the metasurface may be the same as a distance from the center of the antenna array to the other end of the metasurface, i.e., distances from the center of the antenna array to the left and right ends may be the same.

Figure 7:
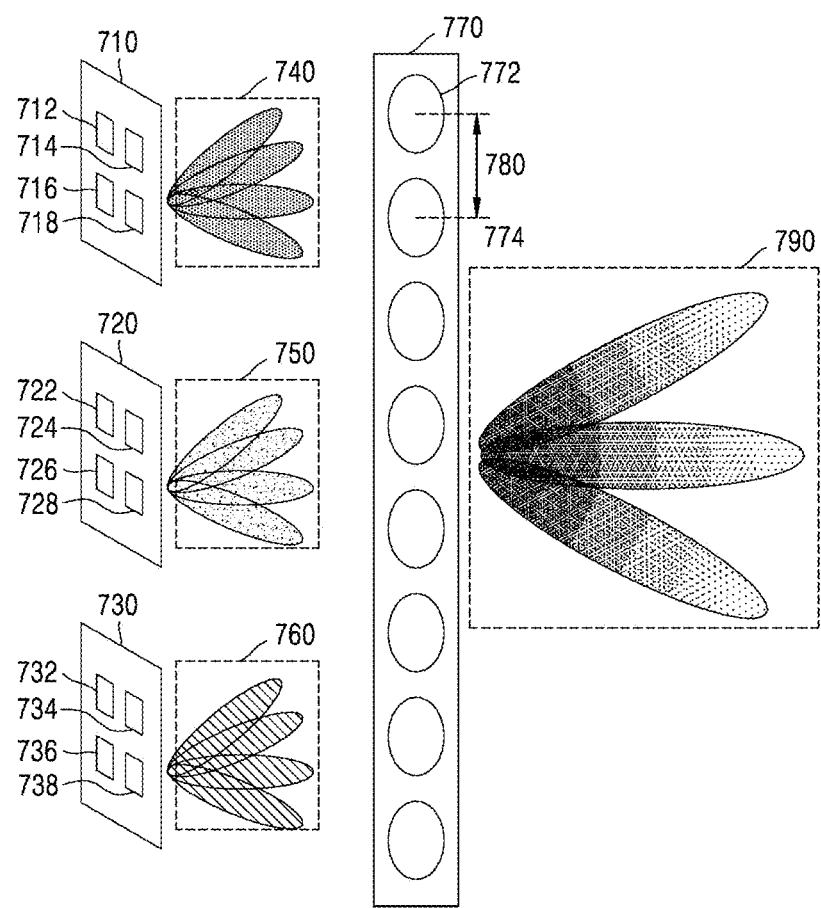
FIG. 7 illustrates a metasurface RF front-end structure, according to an embodiment of the disclosure.

In an embodiment of the disclosure, when the number of TX antennas increases, to receive all beams formed by the increasing TX antennas, the distance 646 from the center of the antenna array to the end of the metasurface may increase. That is, the metasurface may increase in size. In FIG. 7, a more generalized structure of antennas and a metasurface than the multilayer metasurface RF front-end structure of FIG. 5 is illustrated.

FIG. 7 illustrates a metasurface RF front-end structure, according to an embodiment of the disclosure.

Referring to FIG. 7, the metasurface RF front-end structure may be included in a transceiver of an electronic device. The electronic device may refer to a UE, a BS, or another communication node. Furthermore, throughout the specification, an antenna array and an antenna panel may be collectively called an antenna or antennas.

The metasurface RF front-end structure of FIG. 7 may include a first antenna 710, a second antenna 720, and a third antenna 730. However, the number of antennas included in the metasurface RF front-end structure is not limited thereto. Each antenna may include one or more antenna elements. For example, the first antenna 710 may include a first antenna element 712, a second antenna element 714, a third 716 and a fourth antenna element 718, the second antenna 720 may include a fifth antenna element 722, a sixth antenna element 724, a seventh antenna element 726 and an eighth antenna element 728, and the third antenna 730 may include a ninth antenna element 732, a tenth antenna element 734, an eleventh antenna element 736, and a twelfth antenna element 738.

In an embodiment of the disclosure, a TX beam may be formed by each of the plurality of antennas. For example, the first antenna 710 may form first beams 740, the second antenna 720 may form second beams 750, and the third antenna 730 may form third beams 760.

In an embodiment of the disclosure, the metasurface 770 may include one or more unit cells. For example, the metasurface 770 may include a first unit cell 772 and a second unit cell 774. The first unit cell 772 and the second unit cell 774 may be arranged with a certain gap 780.

In an embodiment of the disclosure, the metasurface 770 may produce TX beams for transmission to another electronic device, based on the beams received from the plurality of antennas. For example, the metasurface 770 may produce beams 790 for transmission to another electronic device based on the first beams 740 emanating from the first antenna 710, the second beams 750 emanating from the second antenna 720, and the third beams 760 emanating from the third antenna 730. The metasurface 770 may be arranged to receive all the first beams 740, second beams 750, and third beams 760 emanating from the plurality of antennas. The metasurface 770 may have as large a size as to receive all the first beams 740, second beams 750, and third beams 760 emanating from the plurality of antennas.

In the disclosure, a beam gain, a beamforming gain, or a gain may refer to a gain of the beams 790 emitted through the metasurface 770 versus the beams (e.g., the first beams 740, the second beams 750 and the third beams 760) emanating from the plurality of antennas (e.g., the first antenna 710, the second antenna 720 and the third antenna 730).

An operating method of an electronic device when the metasurface RF front-end structure is formed as in FIG. 7 will be described in connection with FIG. 8.

Figure 8:
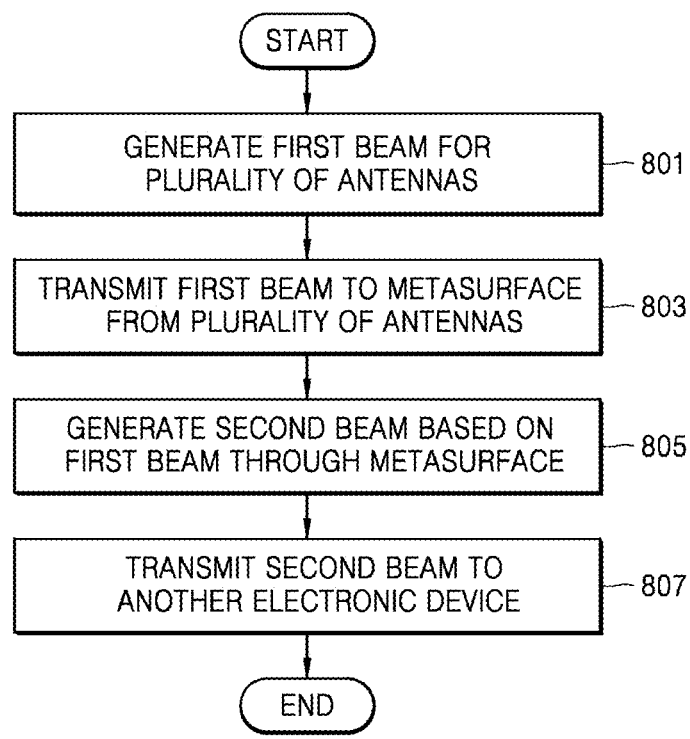
FIG. 8 is a flowchart illustrating an operating method of an electronic device, according to an embodiment of the disclosure.

FIG. 8 is a flowchart illustrating an operating method of an electronic device, according to an embodiment of the disclosure.

Referring to FIG. 8, in operation 810, an electronic device forms first beams for a plurality of antennas. For example, the electronic device may produce TX beams using antenna elements included in the plurality of antennas. In an embodiment of the disclosure, the electronic device may generate a beam through an antenna by taking into account a direction of the beam to be finally produced from the metasurface. Alternatively, the electronic device may emit any beam through an antenna and may produce a beam having desired directivity through preset control over the metasurface.

In operation 803, the electronic device may transmit the first beams to a metasurface module from the plurality of antennas. In other words, beams emanating from the plurality of antennas may be received on the metasurface module. The metasurface module may be arranged to receive all the beams generated for the plurality of antennas. In other words, the size of the metasurface module may be determined to receive all the beams generated for the plurality of antennas. In the disclosure, the metasurface module may refer to a unit including a metasurface.

In operation 805, the electronic device may generate second beams based on the first beams through the metasurface module. For example, the electronic device may create phase differences of radio waves incident to unit cells of the metasurface through deployment of the unit cells included in the metasurface module. Furthermore, the electronic device may re-radiate the radio waves incident onto the unit cells of the metasurface module using the phase differences. Accordingly, the electronic device may concentrate beams emanating from the antennas to a certain direction through the metasurface module. The beams formed from the metasurface module may refer to the second beams.

In operation 807, the electronic device may transmit the second beams to another electronic device. For example, when the electronic device is a terminal, the electronic device may transmit signals to another terminal or a BS using the second beams. When the electronic device is a BS, the electronic device may transmit signals to another BS or a terminal using the second beams.

Two different non-focal feed antennas are illustrated in FIGS. 9A to 10B.

Figure 9A:
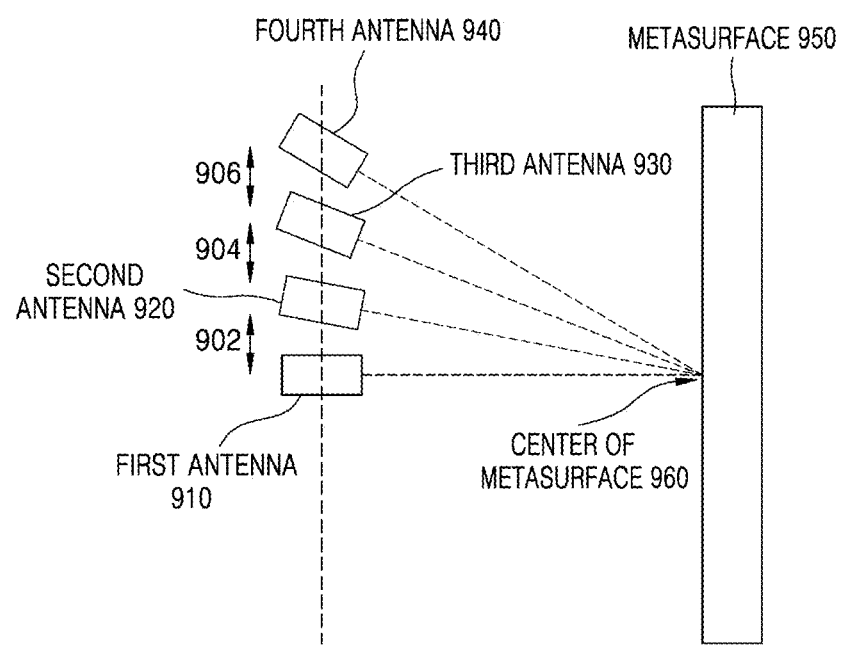
FIG. 9A illustrates antennas linearly arrayed with respect to a metasurface, according to an embodiment of the disclosure.

FIG. 9A illustrates antennas linearly-arrayed with respect to a metasurface, according to an embodiment of the disclosure.

Referring to FIG. 9A, first to fourth antennas 910, 920, 930, and 940 may be arranged with respect to a metasurface 950. In this case, the first to fourth antennas 910, 920, 930, and 940 may be arranged in series. For example, a line passing through the centers of the first to fourth antennas 910, 920, 930, and 940 may be positioned to be parallel to the metasurface 950. Furthermore, the first to fourth antennas 910, 920, 930, and 940 may be arranged equidistantly. For example, the first antenna 910 and the second antenna 920 may be arranged with a first gap 902, the second antenna 920 and the third antenna 930 may be arranged with a second gap 904, and the third antenna 930 and the fourth antenna 940 may be arranged with a third gap 906.

In an embodiment of the disclosure, distances from the first to fourth antennas 910, 920, 930, and 940 to a center 960 of the metasurface may be different. In an embodiment of the disclosure, the first antenna 910 may radiate a beam to be parallel to the center 960 of the metasurface. That is, a trajectory of the beam radiated from the first antenna 910 to the center 960 of the metasurface may be parallel to a plane perpendicular to the metasurface 950 and passing through the center 960 of the metasurface. In other words, an angle formed between the trajectory of the beam radiated from the first antenna 910 to the center 960 of the metasurface and the plane perpendicular to the metasurface 950 and passing through the center 960 of the metasurface may be 0°. In this case, the first antenna 910 may be referred to as a focal antenna. On the other hand, the second to fourth antennas 920, 930, and 940 may not radiate a beam to be parallel to the center 960 of the metasurface 950. In this case, the second to fourth antennas 920, 930, and 940 may be referred to as non-focal antennas.

In the embodiment of the disclosure as shown in FIG. 9A, the plurality of antennas, e.g., the first to fourth antennas 910, 920, 930, and 940, may be arrayed in parallel with the metasurface 950, and distances from the plurality of antennas, e.g., the first to fourth antennas 910, 920, 930, and 940 to the center 960 of the metasurface may be different. Beamforming gains measured for the antennas linearly arrayed with respect to the metasurface 950 as described above in connection with FIG. 9A are illustrated in FIG. 9B.

Figure 9B:
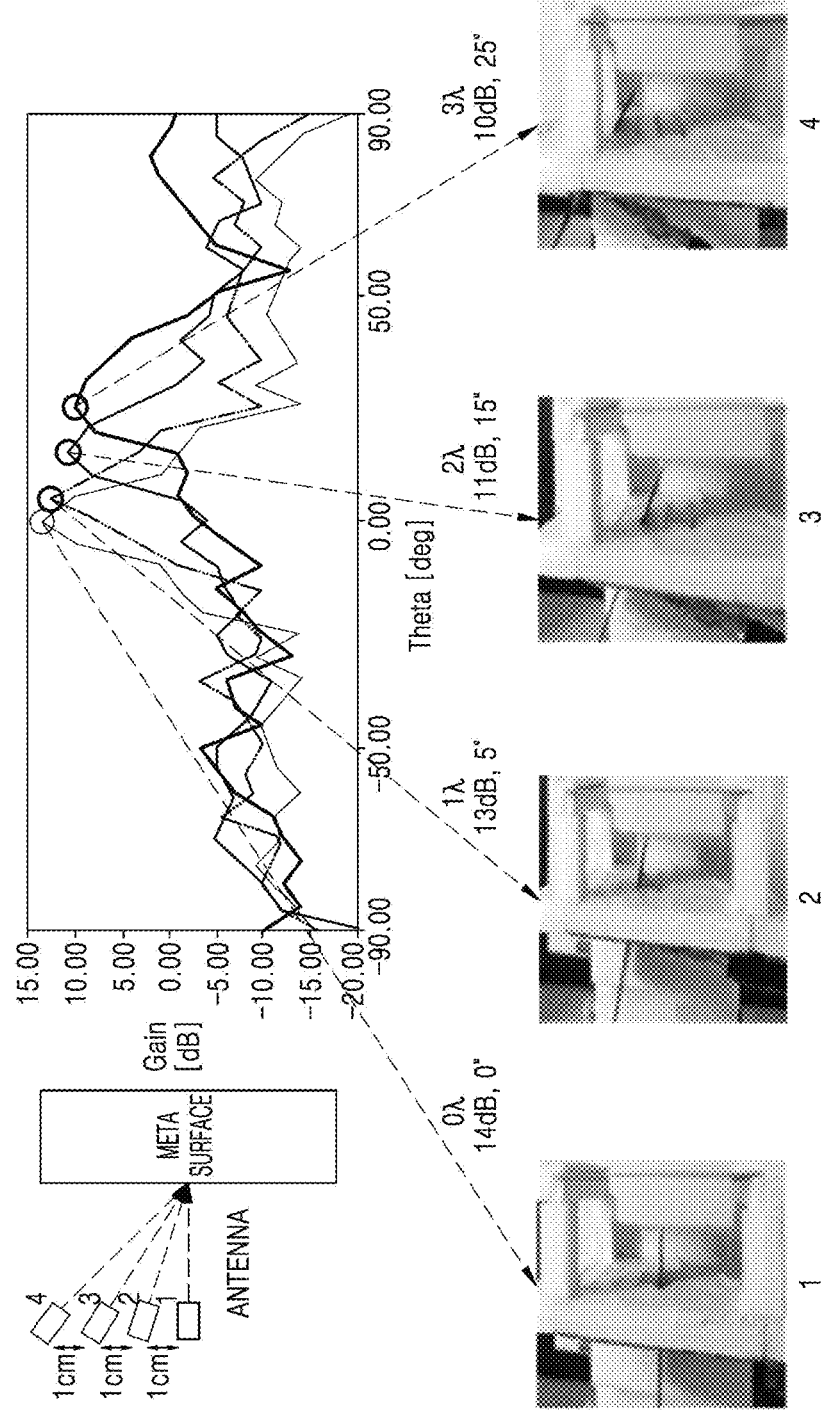
FIG. 9B illustrates a result of measuring beamforming gains for antennas linearly arrayed with respect to a metasurface, according to an embodiment of the disclosure.

FIG. 9B illustrates a result of measuring beamforming gains for antennas linearly arrayed with respect to a metasurface, according to an embodiment of the disclosure.

Referring to FIG. 9B, there may be a plurality of antennas. The plurality of antennas including antenna 1, antenna 2, antenna 3, and antenna 4 of FIG. 9B may correspond to the first antenna 910, the second antenna 920, the third antenna 930, and the fourth antenna 940 of FIG. 9A, respectively. Gaps between the antennas of FIG. 9B may correspond to the gaps of FIG. 9A (e.g., the first gap 902, the second gap 904, and the third gap 906). The metasurface of FIG. 9B may correspond to the metasurface 950 of FIG. 9A. FIG. 9B illustrates beam gains of the metasurface versus antennas based on the position from a focal antenna, i.e., antenna 1, when antennas 1, 2, 3, and 4 radiate beams to the center of the metasurface.

In FIG. 9B, antennas 1, 2, 3, and 4 may be arrayed each with a sweeping angle of 5°. In other words, antennas 1, 2, 3, and 4 may be arranged at intervals of 1 cm. The interval of 1 cm may refer to a value analogous to the length of 1λ for a 28 GHz band. Specifically, FIG. 9B illustrates gains of beams emitted through the metasurface versus beams radiated through the antennas, depending on the position of each antenna from a parallel line passing through the center of the metasurface, for the antennas arranged at intervals of 1λ.

In an experiment as shown in FIG. 9B, the aperture is limited, and the metasurface may include a small number of unit cells. However, the experimental result of FIG. 9B show that even EM waves emanating from the position of the non-feed antenna (e.g., antennas 2, 3, and 4) have significant beam gain and beam steering effects.

Figure 10A:
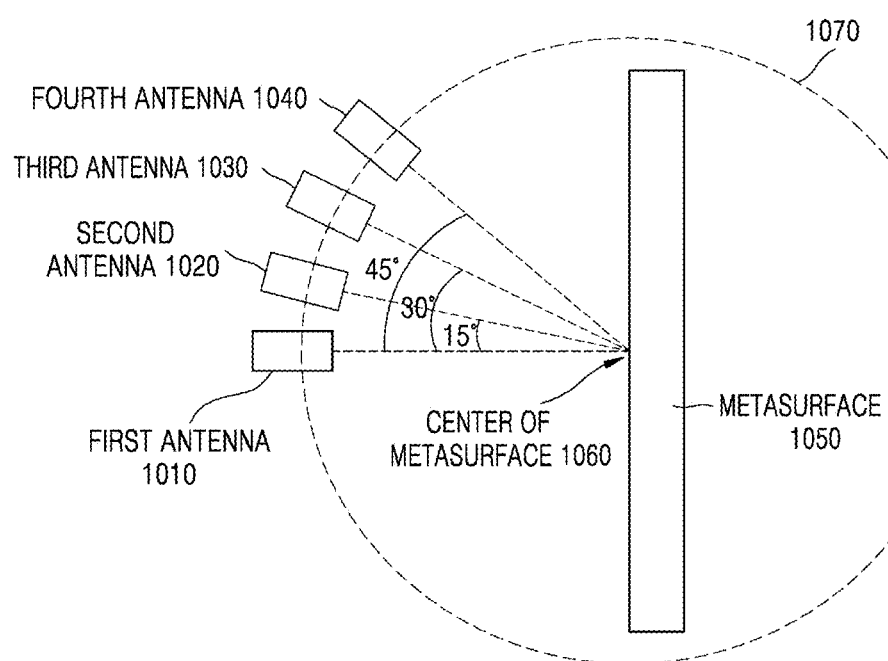
FIG. 10A illustrates antennas radially arrayed with respect to a metasurface, according to an embodiment of the disclosure.

FIG. 10A illustrates antennas radially arrayed with respect to a metasurface, according to an embodiment of the disclosure.

Referring to FIG. 10A, first to fourth antennas 1010, 1020, 1030, and 1040 may be arranged with respect to a metasurface 1050. In this case, the first to fourth antennas 1010, 1020, 1030, and 1040 may be radially arranged. For example, a line passing through the centers of the first to fourth antennas 1010, 1020, 1030, and 1040 may form a circle 1070, and the center of the circle 1070 may be the center 1060 of the metasurface 1050.

Furthermore, the first to fourth antennas 1010, 1020, 1030, and 1040 may be arranged with the same angles. For example, the first antenna 1010 and the second antenna 1020 may be arranged with 15° between them, the second antenna 1020 and the third antenna 1030 may be arranged with 15° between them, and the third antenna 1030 and the fourth antenna 1040 may be arranged with 15° between them.

In an embodiment of the disclosure, the first antenna 1010 may radiate a beam to be parallel to the center 1060 of the metasurface 1050. In this case, the first antenna 1010 may be referred to as a focal antenna. On the other hand, the second to fourth antennas 1020, 1030, and 1040 may not radiate beams to be parallel to the center 1060 of the metasurface 950. In this case, the second to fourth antennas 1020, 1030, and 1040 may be referred to as non-focal antennas.

In the embodiment of the disclosure as shown in FIG. 10A, the plurality of antennas, e.g., the first to fourth antennas 1010, 1020, 1030, and 1040, may be arranged radially or in a circle with respect to the metasurface 1050, and distances from the plurality of antennas, e.g., the first to fourth antennas 1010, 1020, 1030, and 1040 to the center 1060 of the metasurface 1050 may be the same, which is a radius of the circle 1070. Beamforming gains measured for the antennas radially arrayed with respect to the metasurface 1070 as described above in connection with FIG. 10A are illustrated in FIG. 10B.

Figure 10B:
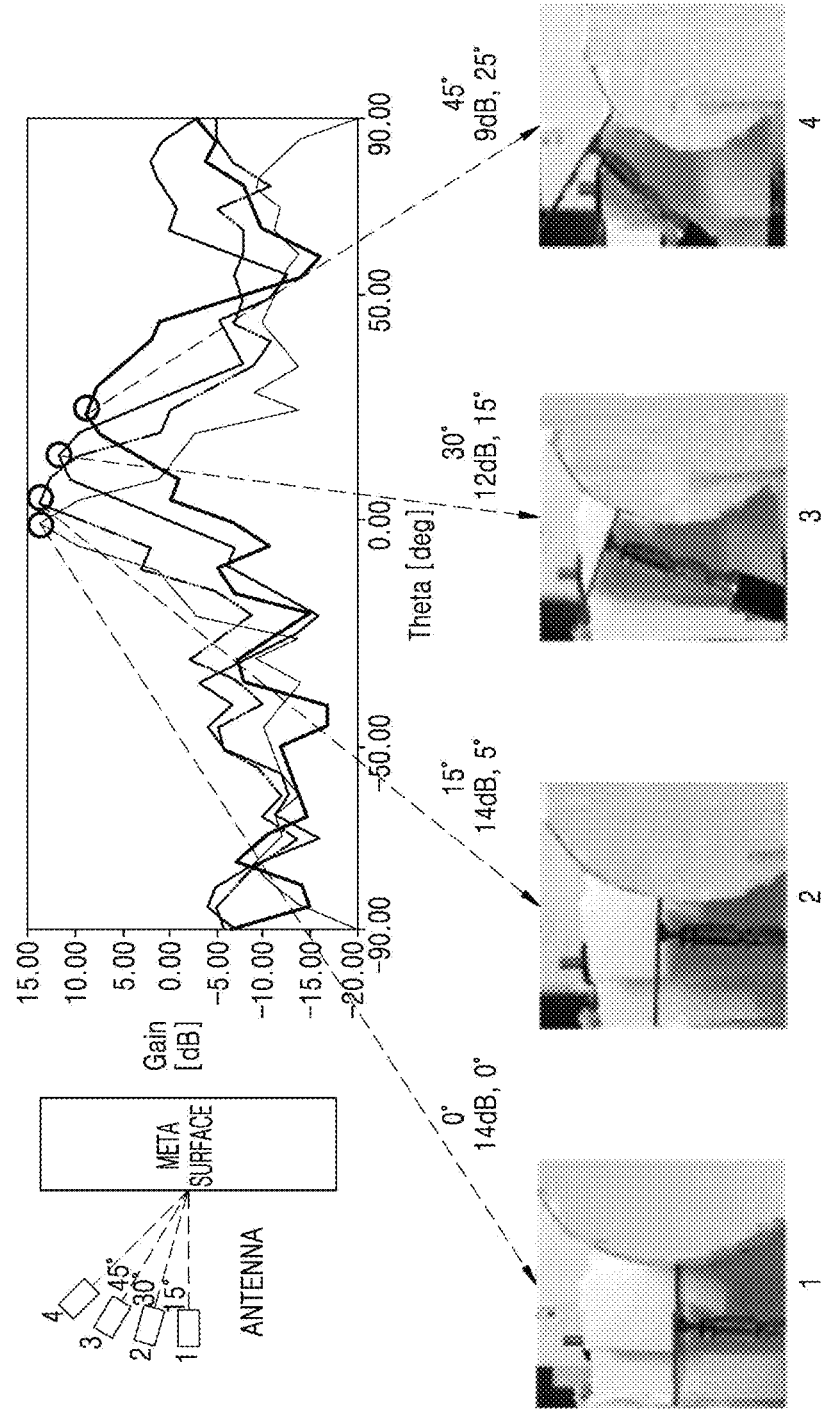
FIG. 10B illustrates a result of measuring beamforming gains for antennas radially arrayed with respect to a metasurface, according to an embodiment of the disclosure.

FIG. 10B illustrates a result of measuring beamforming gains for antennas radially arrayed with respect to a metasurface, according to an embodiment of the disclosure.

Referring to FIG. 9B, there may be a plurality of antennas. The plurality of antennas including antenna 1, antenna 2, antenna 3, and antenna 4 of FIG. 10B may correspond to the first antenna 1010, the second antenna 1020, the third antenna 1030, and the fourth antenna 1040 of FIG. 10A, respectively. The metasurface of FIG. 10B may correspond to the metasurface 1050 of FIG. 10A. FIG. 10B illustrates beam gains of the metasurface versus antennas based on the angle from a focal antenna, i.e., antenna 1, when antennas 1, 2, 3, and 4 radiate beams to the center of the metasurface.

In FIG. 10B, a distance between the center of the metasurface and feed antennas may be fixed to 2 cm. However, angles of the antennas from an axis perpendicular to the metasurface may be different. In an embodiment of the disclosure, the axis perpendicular to the metasurface may refer to an axis connecting the center of the metasurface to the focal antenna, e.g., antenna 1. For example, the angle of antenna 1 from the axis perpendicular to the metasurface may be 0°, the angle of antenna 2 from the axis perpendicular to the metasurface may be 15°, the angle of antenna 3 from the axis perpendicular to the metasurface may be 30° and the angle of antenna 4 from the axis perpendicular to the metasurface may be 45°

In an embodiment of the disclosure, the reason of radially arranging the feed antennas as shown in FIG. 10B is because signal attenuation from a feed antenna to the metasurface is proportional to the distance between the feed antenna and the metasurface. In other words, as the signal attenuation from a feed antenna to the metasurface is proportional to the distance between the feed antenna and the metasurface, the antennas radially arrayed as shown in FIGS. 10A and 10B may have higher gains compared to the antennas linearly arrayed as shown in FIGS. 9A and 9B.

As shown in FIGS. 9A and 9B, the EM waves emanating from the non-focal antenna positions may undergo a beam steering capability with the metasurface designed for significant beamforming gain and a focal point. In an embodiment of the disclosure, to make the most of the beamforming gain of the metasurface taking into account the MIMO operation, the size of aperture and the number of unit cells may be relatively small. For this reason, another metasurface having large aperture and physically reasonable domain and having densely integrated unit cells may be modeled. In this case, meta channel models, which will be described below, may use the radiation patterns as shown in FIGS. 9B and 10B based on metasurface designs represented by $F'_S$ and $F'_u$.

The disclosure proposes metasurface based channel modeling. As the metasurface according to the disclosure may intervene between TX and RX antennas, there is a need to modify the traditional spatial channel model to evaluate overall performance of a wireless communication system using the aforementioned structure as in FIG. 5. Common MIMO spatial channel models may be used to simulate wireless propagation channels in various environments and apply the concept of diversity of multiple antennas to both a transmitter and a receiver.

Despite studies on the metasurface, the studies may just focus on beamforming gains of the metasurface itself but has yet to come up with an idea to incorporate the spatial channel model with the metasurface beamforming. As the metasurface structure in particular has been regarded only for single-layer transmission, there have been fundamental limits in using the metasurface. This is not proper for a tendency of using the spatial multiplexing gain by transmitting multi-data.

Hence, the disclosure proposes incorporation of the metasurface RF front-end structure in association with the MIMO operation. For example, the disclosure proposes an overall spatial channel model called a meta channel. The concept of the meta channel to be formed according to the disclosure will be illustrated in FIG. 11.

FIG. 11 illustrates a system including a meta channel, according to an embodiment of the disclosure.

Referring to FIG. 11, a system including meta channels may include a transmitting device and a receiving device. In an embodiment of the disclosure, the transmitting device may include transmit antennas (e.g., first to third antennas 1102, 1104, and 1106) and a metasurface. A first channel 11200 may be formed between the transmit antennas and the metasurface.

The metasurface may include unit cells, e.g., first to fourth unit cells 1122, 1124, 1126, and 1128. In the transmitting device, the second antenna 1104 may radiate beams to unit cells of the metasurface. The beams may include first to fourth beams 1112, 1114, 1116, and 118. Although FIG. 11 shows only the second antenna 1104 radiating beams, it is not limited thereto. For example, the first antenna 1102 or the third antenna 1106 may also radiate beams.

In an embodiment of the disclosure, the receiving device may include receive antennas (e.g., fourth to sixth antennas 1152, 1154, and 1156) and a metasurface. A second channel 1150 may be formed between the metasurface of the receiving device and the receive antennas.

The metasurface may include unit cells, e.g., fifth to eighth unit cells 1132, 1134, 1136, and 1138. In the receiving device, beams may be transmitted from the metasurface to the fifth antenna 1154. The beams may include fifth to eighth beams 1142, 1144, and 1148. Although FIG. 11 shows only the fifth antenna 1154 receiving beams, it is not limited thereto. For example, the fourth antenna 1152 or the sixth antenna 1156 may also receive beams.

In an embodiment of the disclosure, a meta channel 1130 may be formed between the metasurface of the transmitting device and the metasurface of the receiving device. In an embodiment of the disclosure, a meta channel may be determined based on an AoD or an AoA determined between each of a plurality of antenna elements and each of a plurality of unit cells and a distance between each of a plurality of antenna elements and each of a plurality of unit cells.

In an embodiment of the disclosure, the AoD determined between each of a plurality of antenna elements and each of a plurality of unit cells may refer to a departure angle determined between each of the plurality of antenna elements included in the second antenna 1104 and each of the plurality of unit cells, e.g., the first to fourth unit cells 1122, 1124, 1126, and 1128.

In an embodiment of the disclosure, the AoA determined between each of a plurality of antenna elements and each of a plurality of unit cells may refer to an arrival angle between each of the plurality of unit cells, e.g., the fifth to eighth unit cells 1132, 1134, 1136, and 1138 and each of the plurality of antenna elements included in the fifth antenna 1154.

In an embodiment of the disclosure, a radiation pattern of the plurality of antenna elements may be determined based on the AoD or the AoA. The channel between a plurality of antennas and a metasurface may be determined based on the radiation patterns of the plurality of antenna elements.

Figure 12:
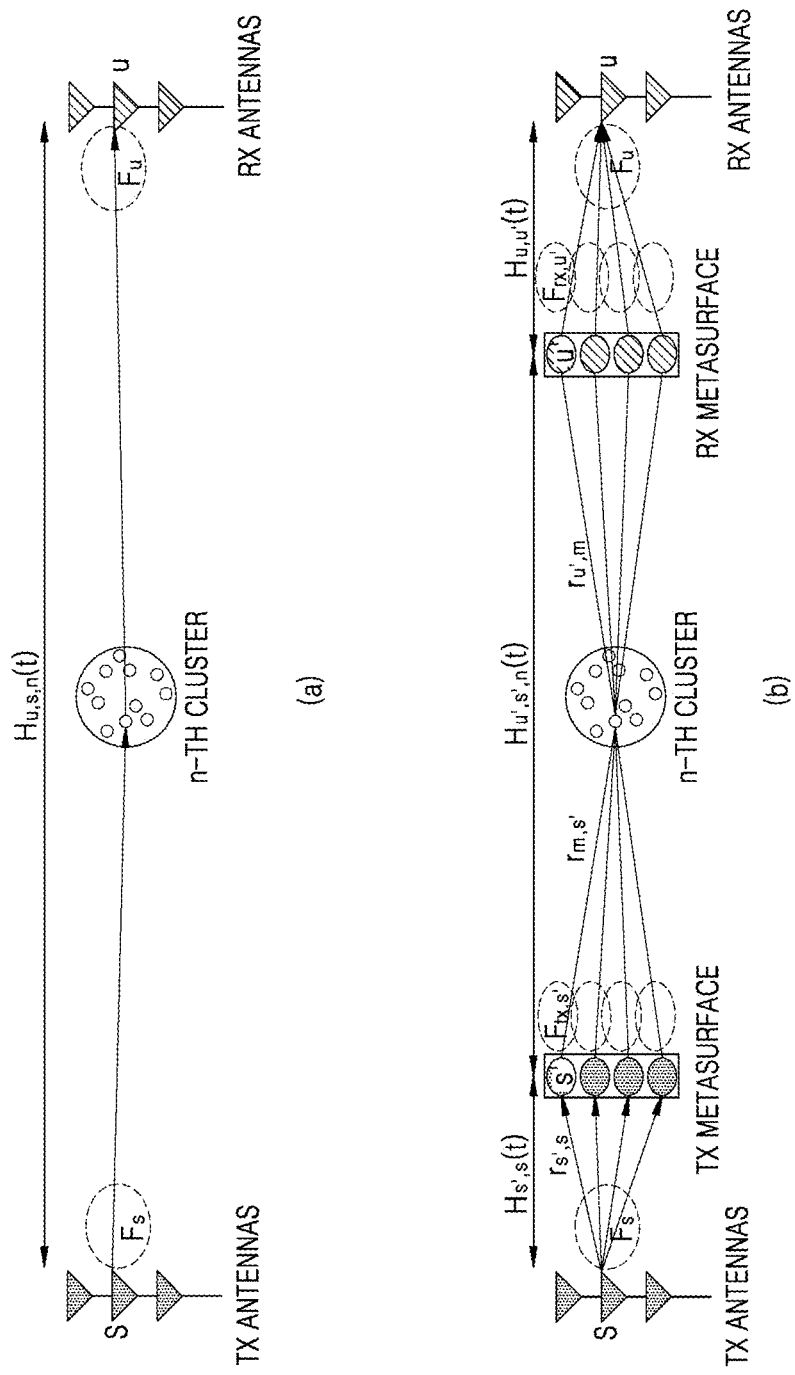
FIG. 12 illustrates a channel model using a metasurface, according to an embodiment of the disclosure.

FIG. 12 illustrates a channel model using a metasurface, according to an embodiment of the disclosure.

Referring to FIG. 12, a meta channel may include three stages. For example, the three stages may include 1) a first stage from a transmit antenna to a transmit meta element (unit cell), 2) a second stage from the transmit meta element to a receive meta element, and 3) a third stage from the receive meta element to a receive antenna. Such cascading channel modeling may be essential and important because beamforming gain and beam direction of the metasurface RF front-end structure is completely different from geometric parameters such as a distance between the metasurface and the antenna, the feed antenna's position, and the gap between meta elements. (A) of FIG. 12 shows a meta channel when the metasurface does not exist or is omitted, and (b) of FIG. 12 shows a configuration of a meta channel when there are a transmit metasurface and a receive metasurface.

Furthermore, from a pragmatic point of view, the whole structures with or without metasurfaces in both the transmitter and the receiver need to be separately considered in a system design. In an embodiment of the disclosure, metasurfaces of the transmitter and the receiver may have different specifications. For example, for a metasurface of the transmitter for a BS, a larger aperture size needs to be used to be more eligible for wider coverage. However, a metasurface for an MS, to eliminate a blind spot, wide beamwidth or diverse beam steering needs to be considered.

In an embodiment of the disclosure, an important factor in relation to the meta channel may be whether the metasurface may attain a sufficient gain as compared with a common phased antenna array gain without a metasurface. Hence, in order to figure out a detailed impact of a metasurface RF front-end, a general metasurface based MIMO channel model needs to be clearly defined, and each scenario needs to be classified based on the channel model. Accordingly, in the disclosure, a whole channel matrix $H_{U,S}(t)$ may be as in the following equation 2:

$$H_{U,S}(t) = \sum_{n=1}^{N} \int_{-\infty}^{\infty} H_{U,S,n}(t, \tau_n)\delta(\tau - \tau_n)d\tau_n \quad \text{[Equation 2]}$$

In the equation 2, $H_{U,S,n}(t, \tau_n)$ may refer to an n-th multipath channel matrix in which excess delay $\tau_n$ occurs. An element of the channel matrix is a metasurface, which may be expressed in an antenna-wise TX-RX pair. In an embodiment of the disclosure, a meta channel may be defined as in the following equation 3.

$$H_{U,S,n}(t) = \begin{bmatrix} h_{1,1,n}(t) & \cdots & h_{1,S,n}(t) \\ \vdots & \ddots & \vdots \\ h_{U,1,n}(t) & \cdots & h_{U,S,n}(t) \end{bmatrix} \quad \text{[Equation 3]}$$

Furthermore, a spatial meta channel from a TX antenna element s to an RX antenna element u may be defined as in the following equation 4:

$$h_{u,s,n}(t) = \sum_{u'=1}^{U'} \sum_{s'=1}^{S'} \sum_{m=1}^{M} F_s(\phi_n) F_{s'}(\phi_{n,m}) F_{u'}(\psi_{n,m}) F_u(\psi_n) \times \frac{e^{-jk_0 r_{s',s}}}{r_{s',s}} \frac{e^{-jk_0 r_{m,s'}}}{r_{m,s'}} \frac{e^{-jk_0 r_{u',m}}}{r_{u',m}} \frac{e^{-jk_0 r_{u,u'}}}{r_{u,u'}} \quad \text{[Equation 4]}$$

In the equation 4, U', S', and M may refer to the number of unit cells in the RX, the number of unit cells in the TX, and a sub-path of a multipath n, respectively. Furthermore, $F_S$, $F_S'$, $F_u'$ and $F_u$ may refer to radiation patterns of a TX antenna, a TX unit cell, an RX unit cell, and an RX antenna, respectively. In an embodiment of the disclosure, each antenna and a metasurface element may have different radiation patterns depending on the position. In particular, unit cells may have different phase characteristics to compensate for phase differences of EM waves emanating from a feed antenna for refracted waves to be formed into plane waves in a certain direction. $\phi_{n,m}$ and $\psi_{n,m}$ may refer to an angle of departure (AoD) of an m-th sub-path from the n-th multipath, and and an angle of arrival (AoA). $k_0$ may refer to a wavenumber. $r_{S',S}$, $r_{m,s'}$, $r_{u',m}$ and $r_{u,u'}$ may refer to distances to each element.

In an embodiment of the disclosure, all distances between antenna elements and unit cells and pairwise distances between the antenna elements and the unit cells may be measured in the unit of wavelength as specified in Table 1.

However, a distance between a metasurface and a cluster or clutter may be measured in the unit of meters because spatial channel models assume far-field propagation extending from a few hundred meters to a few kilometers. Based on the aforementioned channel model, a system capacity may be analyzed by the spatial channel modeling based on the structure as shown in FIG. 5.

In an embodiment of the disclosure, with the meta channel proposed in the disclosure, scalable and analytic researches that may explain design parameters of the metasurface for multi-feed antennas and overall impacts may be done.

Referring to FIG. 12, a channel $H_{s',s}(t)$ may be formed between TX antennas and a TX metasurface. The channel $H_{s',s}(t)$ may refer to the first channel 1120 of FIG. 11. The channel between the TX antennas and the TX metasurface may be expressed as in the following equation 5.

$$H_{s',s}(t) = \frac{e^{-jk_0 r_{s',s}}}{r_{s',s}} F_s(\phi_{s',s}) \qquad \text{[Equation 5]}$$

Also, a channel $H_{u',s',n}(t)$ may be formed between the TX metasurface and an RX metasurface. The channel $H_{u',s',n}(t)$ may refer to the meta channel 1130 of FIG. 11. The channel between the TX metasurface and the RX metasurface may be expressed as in the following equation 6.

$$H_{u',s',n}(t) = \sum_{m=1}^{M} \frac{e^{-jk_0 r_{m,s'}}}{r_{m,s'}} \frac{e^{-jk_0 r_{u',m}}}{r_{u',m}} F_{tx,s'}(\phi_{t,n,m}; \phi_{i,n,m}) \qquad \text{[Equation 6]}$$

Also, a channel $H_{u,u'}(t)$ may be formed between the RX metasurface and RX antennas. The channel $H_{u,u'}(t)$ may refer to the second channel 1150 of FIG. 11. The channel between the RX metasurface and the RX antennas may be expressed as in the following equation 7.

$$H_{u,u'}(t) = \frac{e^{-jk_0 r_{u,u'}}}{r_{u,u'}} F_{rx,u'}(\psi_{t,n,m}; \psi_{i,n,m}) F_u(\psi_{u,u'}) \qquad \text{[Equation 7]}$$

A whole channel from the TX antennas to the RX antennas may be represented as $H_{u,s,n}(t)$. The whole channel $H_{u,s,n}(t)$ may refer to a cascading channel including the first channel 1120, the meta channel 1130, and the second channel 1150 of FIG. 11. The whole channel from the TX antennas to the RX antennas may be expressed as in the following equation 8.

$$H_{u,s,n}(t) = \sum_{u'=1}^{U'} \sum_{s'=1}^{S'} \sum_{m=1}^{M} F_s(\phi_{s',s}) \qquad \text{[Equation 8]}$$

$$F_{tx,s'}(\phi_{t,n,m}; \phi_{i,n,m}) F_{rx,u'}(\psi_{t,n,m}; \psi_{i,n,m}) F_u(\psi_{u,u'})$$

$$\frac{e^{-jk_0 r_{u,u'}}}{r_{u,u'}} \frac{e^{-jk_0 r_{s',s}}}{r_{s',s}} \frac{e^{-jk_0 r_{m,s'}}}{r_{m,s'}} \frac{e^{-jk_0 r_{u',m}}}{r_{u',m}}$$

Figure 13:
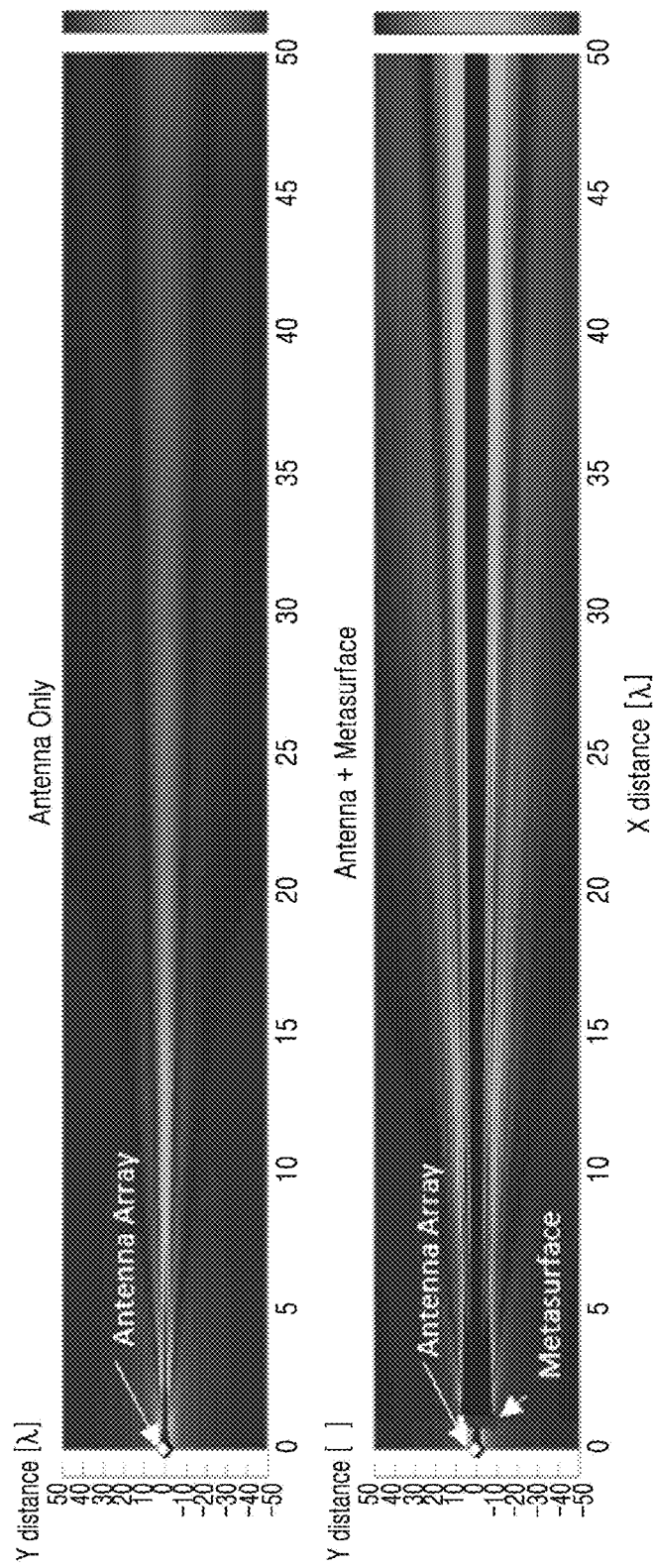
FIG. 13 illustrates beamforming results due to a metadata, according to an embodiment of the disclosure.

FIG. 13 illustrates beamforming results due to a metadata, according to an embodiment of the disclosure.

In other words, FIG. 13 illustrates beamforming effects of a metasurface compared with an antenna array design. The metasurface may receive EM waves from antenna arrays. The metasurface may then emanate EM waves with phase delays. The phase delayed EM waves may be constructively interfered with each other, and may thus provide a higher beamforming gain in a desired direction. This beamforming gain may be used to derive far-field radiation patterns $F_{s'}(\phi)$ and $F_{u'}(\psi)$ of a TX metasurface and an RX metasurface. Referring to FIG. 13, it may be seen that higher beamforming gains are attained in a structure with both antennas and a metasurface rather than a structure only with antennas.

In an embodiment of the disclosure, when a metasurface design is fixed, a composite radiation pattern of a metasurface-feed antenna pair may be determined based on design parameters such as radiation patterns, positions of feed antennas, and meta element properties.

In an embodiment of the disclosure, a distance between an antenna and the metasurface, the number of metasurface elements, a metasurface, and phase characteristics may be determined. Accordingly, the spatial meta channel from the TX antenna s to the RX antenna u of the equation 4 may be simplified to the following equation 9:

$$h_{u,s,n}(t) = \sum_{m=1}^{M} F_s'(\phi_{n,m}) F_u'(\psi_{n,m}) \frac{e^{-jk_0 r_{m,s'}}}{r_{m,s'}} \frac{e^{-jk_0 r_{u',m}}}{r_{u',m}} \qquad \text{[Equation 9]}$$

In equation 9, $F_{s'} = \sum_{s'=1}^{S'} F_s(\phi_n) F_{s'}(\phi_{n,m}) e^{-jk_0 r_{s',s}}/r_{s',s}$ and $F_{u'} = \sum_{u'=1}^{U'} F_u(\psi_n) F_{u'}(\psi_{n,m}) e^{-jk_0 r_{u',u}}/r_{u',u}$ may refer to composite radiation patterns from designated antenna-metasurface pairs of the TX and the RX, respectively.

Figure 14:
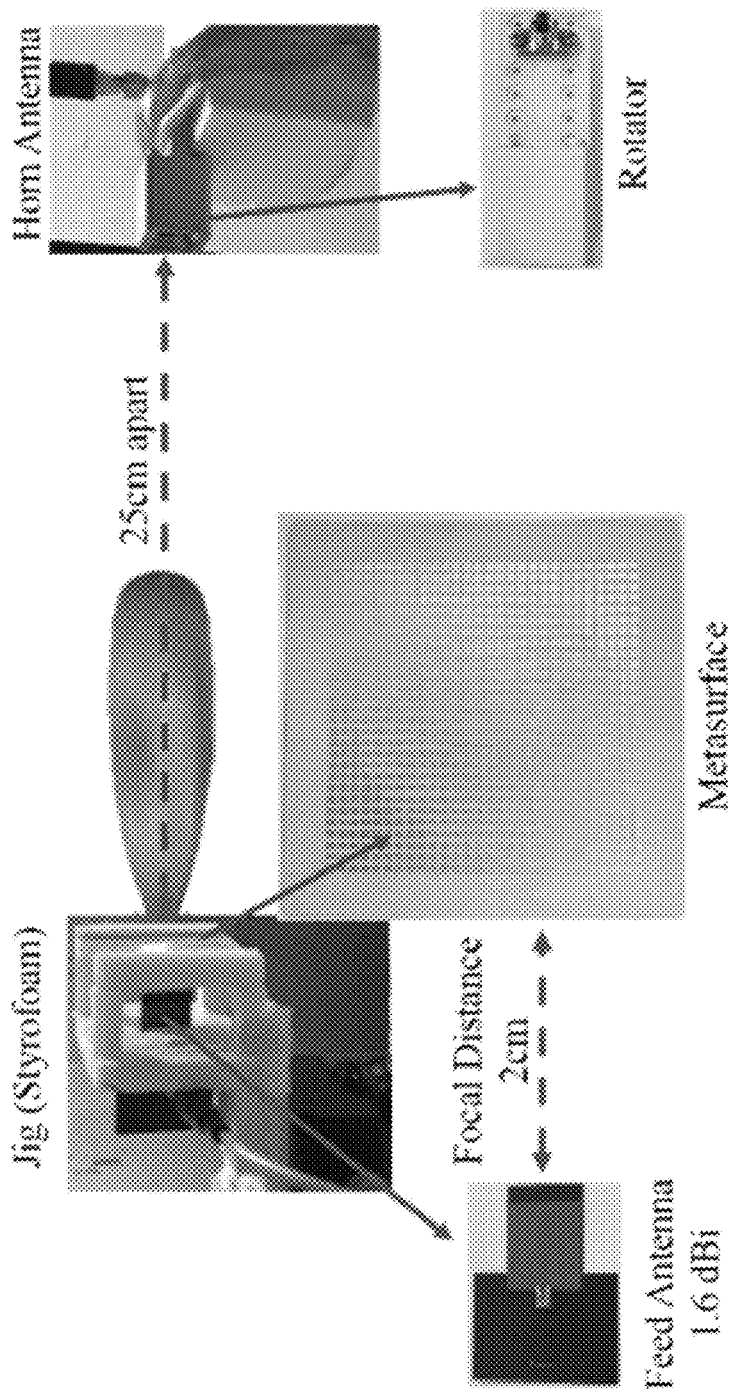
FIG. 14 illustrates a setup for measuring a radiation pattern using a metasurface, according to an embodiment of the disclosure.

FIG. 14 illustrates a setup for measuring a radiation pattern using a metasurface, according to an embodiment of the disclosure.

Referring to FIG. 14, to verify feasibility of a metasurface with a fixed antenna array, a metasurface RF front-end prototype may be designed and implemented. Accordingly, FIG. 14 is a schematic measurement setup in the prototype. The schematic of FIG. 14 may include a feed antenna, a metasurface, a jig, a horn antenna, and a rotator.

To verify the feasibility, the prototype metasurface may be located 2 cm away from a feed dipole antenna having 1.6 dBi gain. The horn antenna may be located 25 cm away from the prototype metasurface to measure S21 parameters with a vector network analyzer (e.g., Anritsu MS46122A). An aperture size of the prototype metasurface may be 50.4 mm×50.4 mm with 28×28 unit cells. A center frequency may be set to 28 GHz.

As described above in connection with FIG. 4, a lens antenna or a single-layer metasurface is designed with a single focal point to increase beamforming gains. There may be, however, not only the single focal point but also a focal plane, a plane perpendicular to the axis of the lens, the plane passing through the focal point. An antenna located on the focal plane may attain beamforming gains as similar as the metasurface.

As described above in connection with FIG. 5, to attain beamforming gains with a large-aperture metasurface, multiple antennas may be arranged on the focal plane. Various simulations may be performed to estimate geometric parameters such as the number of antennas and unit cells, a distance between an antenna and the metasurface, antenna intervals and unit cell intervals. FIGS. 15 to 18 show possibilities of a MIMO metasurface RF front-end, according to the disclosure, and values shown in FIGS. 15 to 18 are merely examples. Depending on various design factors such as feed antenna characteristics or amplitude and phase offsets of a metasurface, a metasurface RF front-end design may have better characteristics.

Figure 15:
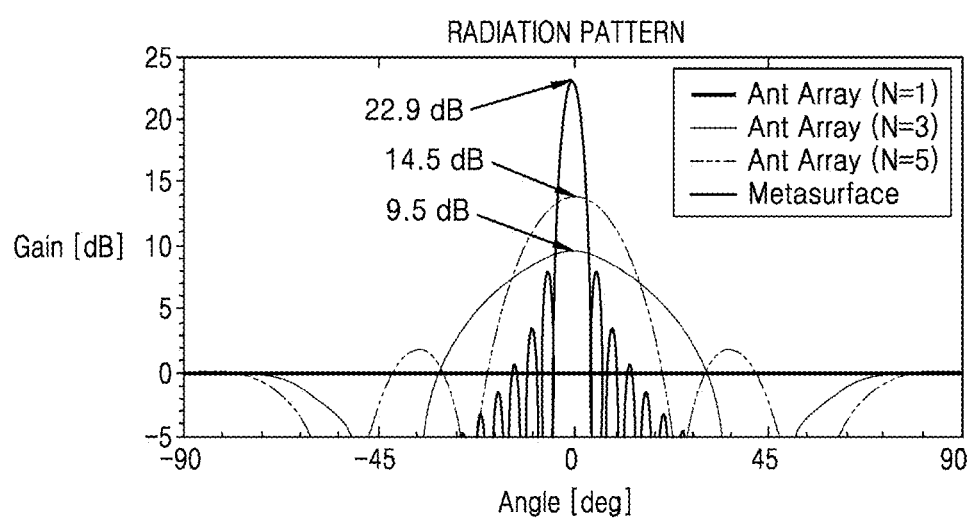
FIG. 15 illustrates beamforming gains of antenna arrays and a metasurface, according to an embodiment of the disclosure.

FIG. 15 illustrates beamforming gains of antenna arrays and a metasurface, according to an embodiment of the disclosure.

Specifically, FIG. 15 shows radiation patterns and gains of antenna arrays each having a different number of antennas, and a radiation pattern and gains of a metasurface having single-feed antennas located at intervals of 10λ. Referring to FIG. 15, compared with antenna array patterns, the metasurface may attain higher beamforming gains. From results shown in FIG. 15, the metasurface may include 151 unit cells arranged at intervals of 0.1λ. To form an equiphase plane from a square wave of the feed antenna, each of the unit cells may have a different phase offset value. In the embodiment of the disclosure, the antenna arrays may be 0.5λ away from each other. In FIG. 15, shown is a radiation pattern of a single antenna for N=1, in which the beam gain is 0 dB. A radiation pattern of antennas for N=5 is shown, in which the beam gain with respect to the boresight is 14.5 dB. On the other hand, a metasurface design according to the disclosure may have a beam gain of 22.9 dB. This is 8.4 dB higher than the beam gain of the antennas for N=5.

An antenna array may transmit the same co-phased signals to attain a beam gain using multiple antenna elements simultaneously. The structure using the metasurface according to the disclosure, however, may require a single antenna and attain a higher beamforming gain according to the aperture size of the metasurface.

On the other hand, in an antenna array design according to the disclosure, rather than relatively wide beamwidth and less severe side lobes, narrow beamwidth and parasitic high side lobes may be attained. These results may be attributed to the design of a metasurface including uniformly-spaced unit cells having phase compensation.

In an embodiment of the disclosure, a radiation pattern of a feed antenna may be initially set to radiate a square wave from a single point in the beginning.

Using different feed antenna designs and patterns, there may be more diverse results of the meta surface antenna pairs. Accordingly, the metasurface front-end design may be further enhanced by jointly designing both the feed antenna and the metasurface unit cells. The results shown in FIGS. 16A and 16B may represent beamforming gains of different antenna positions.

Figure 16A:
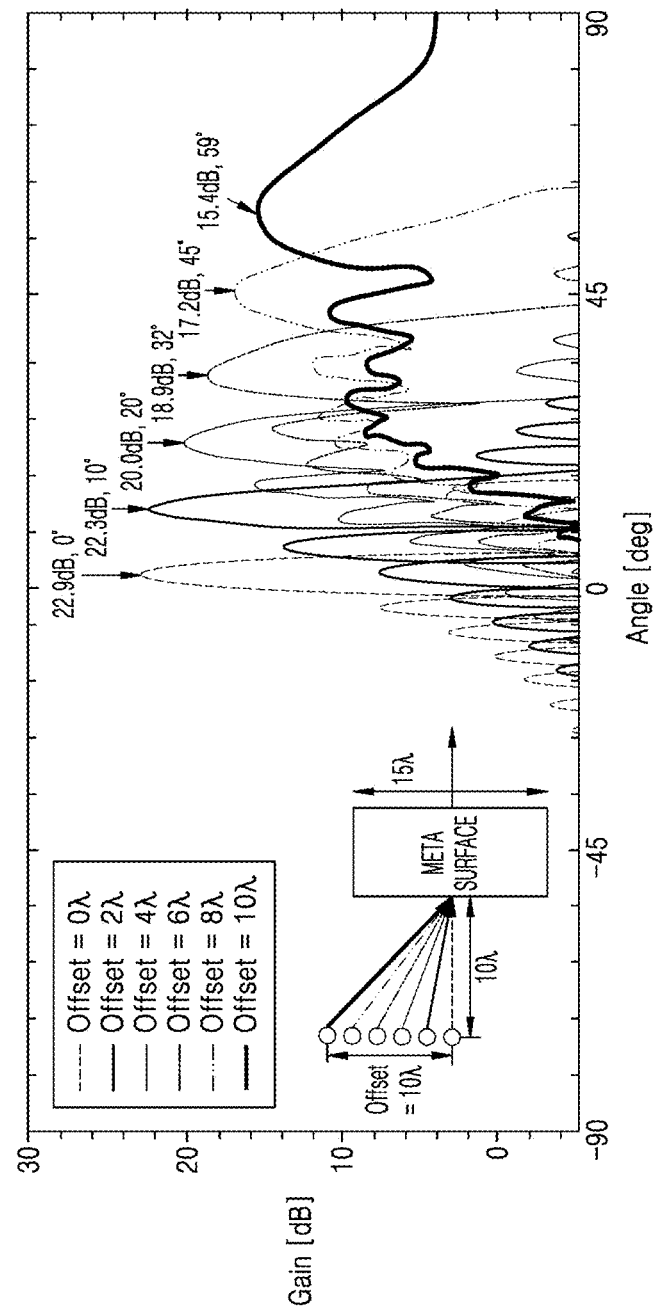
FIG. 16A illustrates gains depending on angles of linear non-focal feed antennas, according to an embodiment of the disclosure.

FIG. 16A illustrates gains depending on angles of linear non-focal feed antennas, according to an embodiment of the disclosure.

Referring to FIG. 16A, it is seen that non-focal antennas have similar beamforming gains to those of a focal antenna. It may indicate validity in the metasurface RF front-end design for a MIMO operation. To indicate a MIMO channel, radiation patterns of the non-focal feed antennas may need to be understood before the metasurface. Otherwise, the metasurface transmits only a single data stream, and in this case, spatial multiplexing may not be used.

Plots in the graph of FIG. 16A schematically illustrate positions of feed antennas (in black circles) and a metasurface (in rectangular shape). The metasurface may be designed to collect square waves coming out from a focal point placed at the center of the metasurface. The farther the feed antenna from the focal point, the less the beamforming gain attained. This may be caused by the following two reasons: Reason 1) as the distance between the center of the metasurface and the feed antenna increases, amplitude of EM waves incident onto the metasurface may be reduced.

Reason 2) phase compensation may no longer be validated for non-focal areas. Hence, the metasurface may be unable to form a conformal wavefront in a designated direction in which to attain a beamforming gain.

Figure 16B:
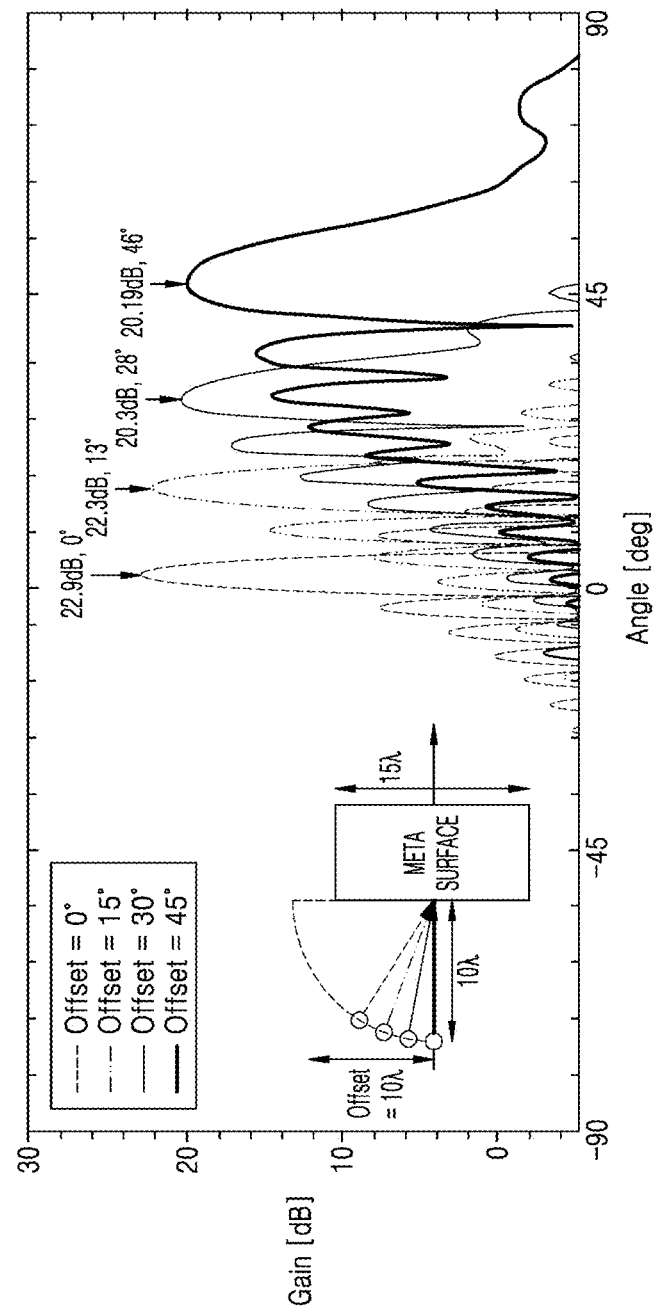
FIG. 16B illustrates gains depending on angles of radial non-focal feed antennas, according to an embodiment of the disclosure.

FIG. 16B illustrates gains depending on angles of radial non-focal feed antennas, according to an embodiment of the disclosure, In other words, FIG. 16B shows different beamforming results of the non-focal feed antennas than in FIG. 16A. FIG. 16B differs from FIG. 16A in that a position of a feed antenna is determined based on a difference in angle oriented from the center of the metasurface.

Referring to FIG. 16B, by increasing the offset angle of 15°, the radiation pattern may have a similar azimuth shifted pattern as well. Compared with what is described in connection with FIG. 16A, the beamforming gain may be less diminished in the embodiment of the disclosure as shown in FIG. 16B. For example, a radiation pattern of an offset with incident angle 45° in FIG. 16B and the radiation pattern of the offset of 10λ in FIG. 16A may have different beamforming gains and patterns despite having the same incident angle.

As described above, the distance between the metasurface and the feed antenna may be closely related to the two features, such as beamforming gains and radiation patterns. In the radial non-focal antenna structure, as the non-focal antennas are equidistantly separated from the metasurface of FIG. 16B, incident power of the feed antenna may be less attenuated than in the linear non-focal feed antenna structure.

In an embodiment of the disclosure, both structures in FIGS. 16A and 16B may have advantages. For example, in the case of the structure of FIG. 16A, an antenna array has a linear and uniform gap, and may thus be printed on a flat substrate, making it easy to manufacture the structure of FIG. 16A. Furthermore, using an advanced beamforming scheme such as non-uniform feed antennas or analog beamforming, the beamforming gain loss may be mitigated compared with the focal feed antennas. On the other hand, in the case of the structure of FIG. 16B, refracted beam direction is well-aligned with an incident beam direction, which may further facilitate geometry modeling.

Furthermore, the radially arrayed non-focal antennas may attain significant beamforming gains compared with the focal antennas. Accordingly, there may be no need for an additional beamforming structure in order to use the metasurface based RF structure. This may help a system designer utilize the metasurface RF front-end structure without phase shifters in the beginning.

In an embodiment of the disclosure, a capacity gain of the metasurface may be considered. For example, based on ITU-R M.2135, using a spatial channel model expressed in the equation 9, a modified MIMO spatial channel model may be simulated.

For example, an urban macrocell scenario may be considered. For evaluation, the 3-sector BS antenna pattern of the 3GPP spatial channel model may be used and compared with a result of a metasurface antenna array having a normal radiation pattern. In the 3-sector scenario, an antenna pattern used for each sector may be defined as in the following equation 10:

$$A_3(\theta) = -\min\left[12\left(\frac{\theta}{\theta_{3dB}}\right)^2, A_m\right], -\pi \leq \theta \leq \pi \qquad \text{[Equation 10]}$$

In the equation 10, $\theta_{3dB}$ may be 70°, and $A_m$ may be 20 dB. A gain for the 3-sector 70° antenna ($G_3$) may be set to 14 dBi. Accordingly, the 3-sector antenna radiation pattern $F_3(\theta)=A_3(\theta)+G_3$ may be used to extract reference channel realizations.

Figure 17:
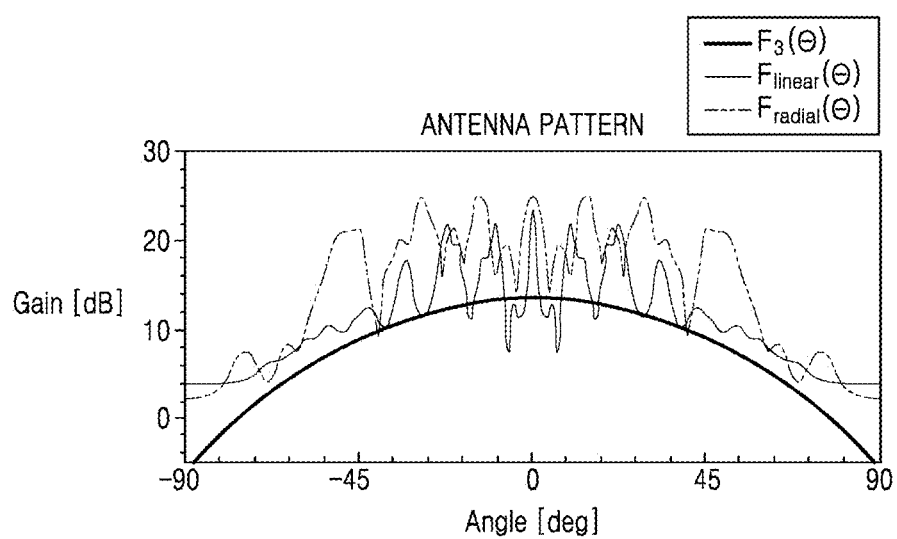
FIG. 17 illustrates an antenna pattern, according to an embodiment of the disclosure.

FIG. 17 illustrates an antenna pattern, according to an embodiment of the disclosure. Specifically, FIG. 17 shows an overall radiation pattern of a reference antenna, and metasurface radiation patterns having linear antenna deployment and radial antenna deployment. In an embodiment of the disclosure, the metasurface radiation patterns do not include feed antenna beam steering, but the beam steering may be further improved with an efficient analog beam steering technology using an RF phase shifter.

In an embodiment of the disclosure, fast fading channel matrices $H_{U,S,n}(t)$ may be produced by changing the radiation pattern of the metasurface and fixing all the other general parameters to evaluate the system capacity.

In an embodiment of the disclosure, as a performance metric, ergodic capacity for a spatial multiplexing gain of the MIMO operation may be considered. When the same power allocation across a TX signal vector n uncorrelated with TX antennas is assumed, an instantaneous capacity may be defined as in the following equation 1:

$$C_{inst} = \log_2 \det\left(I_{N_r} + \frac{\rho}{N_t}\right)HH^H \quad \text{[Equation 11]}$$

In the equation 11, det (·) refers to a determinant, $I_{N_r}$ refers to a $N_r \times N_t$ unit matrix, and p refers to a ratio between TX power and RX power (TX SNR). The ergodic capacity may be obtained by averaging instantaneous capacities for many channel realizations.

In an embodiment of the disclosure, an MS is dropped drops 1,000 times in the evaluation, and time duration of each drop may last for 0.1 second. A time frame of the drop may be set to 1 ms. $N_t \times N_r$ may be set to 1×1, 2×2, 4×4 and 8×8 to demonstrate capacity enhancement caused by spatial multiplexing. A carrier frequency may be set to $f_c$=100 GHz when the 3GPP channel model is reflected. When another channel model is applied, the carrier frequency may be set to 100 GHz or higher. A UE may be dropped to a different value ρ between 0 to 30 dB. To observe a capacity gain caused by the metasurface, the metasurface may be adopted for the same UE structure, geometries and statistical parameters. The UE may be set to have an isotropic radiation pattern. Distances between neighboring elements in the BS and the MS may be 4λ and 0.5λ apart, respectively.

Figure 18:
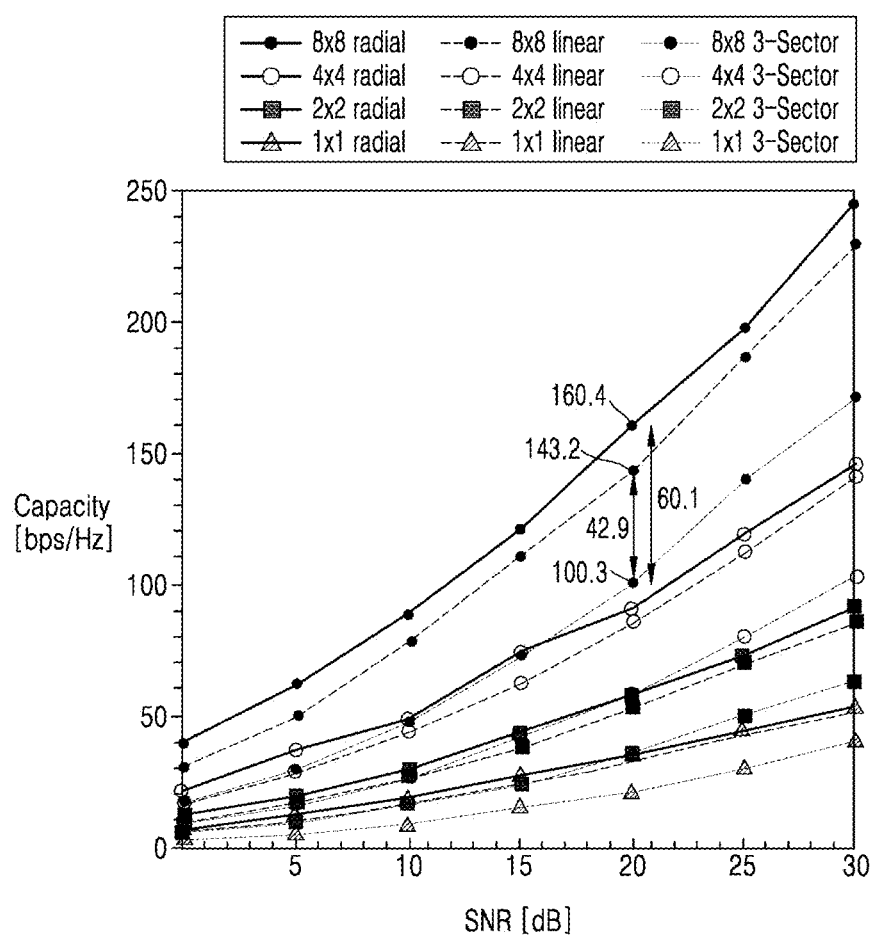
FIG. 18 illustrates an average user equipment (UE) capacity due to a metasurface, according to an embodiment of the disclosure.

FIG. 18 illustrates an average UE capacity due to a metasurface, according to an embodiment of the disclosure.

Referring to FIG. 18, an average UE capacity may be improved due to the metasurface. This may indicate that an overall channel capacity is improved according to a metasurface RF front-end design and a corresponding MIMO operation. For example, in 8×8 TX and RX antenna configuration, when ρ is set to 20 dB, the capacity of radial antenna deployment may attain 160.4 bps/Hz, and the capacity of linear antenna deployment may attain 143.2 bps/Hz. On the other hand, the capacity of 3-sector antennas may attain 100.3 bps/Hz. The results may be attributed to both the radial antenna deployment and the linear antenna deployment having higher beamforming gains than the 3-sector antennas.

In most cases, the same reason as mentioned above may be applied. For example, when a beamforming gain is high, a higher channel capacity may be obtained. For example, the radial antenna deployment may attain a higher capacity than in the linear antenna deployment because the radial antenna deployment has a bit higher radiation pattern than in the linear antenna deployment as shown in FIG. 17. In other words, as the beamforming gain of the radial antenna deployment is a little higher than that of the linear antenna deployment, the radial antenna deployment may attain higher channel capacity than in the linear antenna deployment.

In an embodiment of the disclosure, there are insufficient hybrid beamforming technologies to improve a radiation pattern for use of a spatial channel. However, as described above in connection with FIG. 17, the metasurface RF front-end may be attained with a single feed antenna compared to an antenna array of multiple feed antennas. Hence, when the metasurface structure is to be used in terms of hybrid beamforming, better performance may be attained.

In an embodiment of the disclosure, an advantage of the metasurface RF front-end structure proposed in the disclosure is that there are no additional requirements in a design to use the structure. In an embodiment of the disclosure, the gain of the metasurface may be attributed to intrinsic properties of EM waves given that dispersive waves may be focused to a designated direction with unprecedented material itself In FIG. 18, a difference in experimental result between the 3-sector antenna and the metamaterial may indicate whether to design and deploy a metasurface between TX and RX to control a propagation channel.

Figure 19:
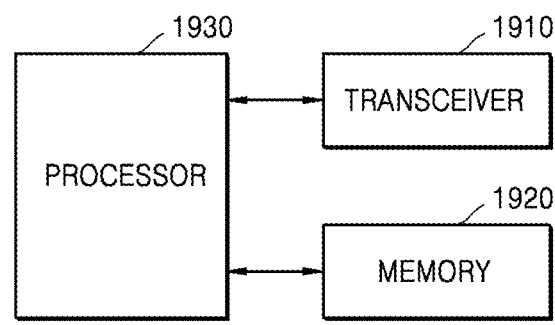
FIG. 19 is a block diagram illustrating a configuration of an electronic device, according to an embodiment of the disclosure.

FIG. 19 is a block diagram illustrating a configuration of an electronic device according to an embodiment of the disclosure.

Referring to FIG. 19, an electronic device in the disclosure may include a processor 1930, a transceiver 1910, and a memory 1920. Components of the electronic device are not, however, limited thereto. For example, the electronic device may include more or fewer elements than described above. In addition, the processor 1930, the transceiver 1910, and the memory 1920 may be implemented in a single chip.

In an embodiment of the disclosure, the processor 1930 may control a series of processes for the electronic device to be operated according to the embodiments of the disclosure. For example, the processor 330 may control the components of the electronic device to transmit or receive signals in a wireless communication system according to embodiments of the disclosure. The processor 1930 may be provided in the plural, which may perform the operation of transmitting or receiving signals in the wireless communication system as described above by carrying out a program stored in the memory 1920.

In an embodiment of the disclosure, when the electronic device is a UE, the transceiver 1910 may transmit or receive signals to or from a BS. The signals to be transmitted to or received from the BS may include control information and data. The transceiver 1910 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 1910 are not limited to the RF transmitter and RF receiver. In addition, the transceiver 1910 may receive a signal on a wireless channel and output the signal to the processor 1930, or transmit a signal output from the processor 1930 on a wireless channel.

In an embodiment of the disclosure, when the electronic device is a BS, the transceiver 1910 may transmit or receive signals to or from a UE. The signals to be transmitted to or received from the UE may include control information and data. The transceiver 1910 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 1910 are not limited to the RF transmitter and RF receiver. In addition, the transceiver 1910 may receive a signal on a wireless channel and output the signal to the processor 1930, or transmit a signal output from the processor 1930 on a wireless channel.

In embodiments of the disclosure, the memory 1920 may store a program and data required for operation of the electronic device. Furthermore, the memory 1920 may store control information or data included in a signal transmitted or received by the electronic device. The memory 1920 may include a storage medium such as a read only memory (ROM), a random access memory (RAM), a hard disk, a compact disc ROM (CD-ROM), and a digital versatile disc (DVD), or a combination of storage mediums. Moreover, the memory 1920 may be provided in the plural. In an embodiment, the memory 1920 may store a program for operations of transmitting or receiving signals in a wireless communication system as described above.

Figure 20:
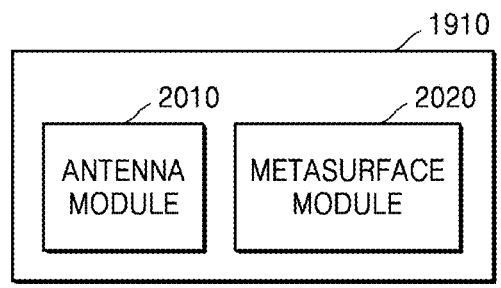
FIG. 20 is a block diagram illustrating a configuration of a transceiver of an electronic device, according to an embodiment of the disclosure.

FIG. 20 is a block diagram illustrating a configuration of a transceiver of an electronic device, according to an embodiment of the disclosure.

Referring to FIG. 20, the transceiver 1910 of FIG. 19 may include an antenna module 2010, and a metasurface module 2020. The components of the transceiver 1910 are not, however limited thereto, and the antenna module 2010 or the metasurface module 2020 may be separately configured.

In an embodiment of the disclosure, the antenna module 2010 may include a plurality of antennas. Each of the plurality of antennas may be referred to as an antenna array or a feed antenna. Each of the plurality of antennas may include a plurality of antenna elements. In an embodiment of the disclosure, the metasurface module 2020 may include a plurality of unit cells. The metasurface module 2020 may also include a metasurface.

In an embodiment of the disclosure, the processor 1930 of FIG. 19 may generate first beams for the plurality of antennas, transmit the first beams to the metasurface module 2020 from the plurality of antennas, generate second beams based on the first beams through the metasurface module 2020, and transmit the second beams to another electronic device. The metasurface module 2020 may be arranged to receive the first beams generated for the plurality of antennas. The size of the metasurface included in the metasurface module 2020 may be larger than a threshold related to receiving the first beams generated for the plurality of antennas. The threshold related to receiving the first beams may refer to a size of the metasurface which is enough to receive the first beams.

In the disclosure, a new RF front-end design using the metasurface is proposed. By adopting well-designed metasurface and multiple antennas, the design proposed in the disclosure may attain higher beamforming gain and capacity gain than in the current RF front-end design with no metasurface. There has been no research on associating the metasurface with the system capacity gain. The disclosure concatenates an independent research on the metasurface in relation to the beamforming gain and the whole system-aspect capacity gain through a new approach of spatial channel modeling. This breaks the stereotype that the metasurface is used for single layer transmission.

As may be seen in measurements and simulation results about beamforming gains, non-focal antennas have small beamforming gains and undergo irregular irradiation patterns but may benefit largely from the metasurface designed for the focal antenna Despite the shortage of bandwidth, mobile communication limited hardware, because of high attenuation and RF loss, the reason of difficulty in using higher frequencies is clear. Due to these adversities, mobile network operators have hesitated to use higher bandwidth in a cellular network, and accordingly, the advent of 6G has been delayed. For these reasons, the metasurface RF front-end may be an effective solution beyond chronic limits of the current system.

Furthermore, as the size of unit cells may correspond to a wavelength of the EM waves, when the frequency increases, more unit cells may be embedded in the same aperture of the metasurface, and as a result, link budget may increase.

A programmable metasurface that is able to adaptively change phase shifting properties may be introduced. For example, one way to obtain the programmable metasurface is to introduce varactors for the unit cell. An applied DC voltage may operate the varactor as an adjustable capacitor, having an influence on resonance, thereby controlling the effective refractive index.

The programmable metasurface may provide not only the MIMO operation but also a new degree of freedom for beam steering, based on the RF front-end structure proposed as in FIG. 5. Accordingly, another efficient way to increase device efficiency in a high frequency band may be provided. A metasurface RF front-end design according to the disclosure may be used for a future cellular network.

Methods according to the claims of the disclosure or the embodiments of the disclosure described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide LAN (WLAN), or a storage area network (SAN), or a combination thereof. The storage device may be connected to an apparatus performing the embodiments of the disclosure through an external port. Furthermore, an extra storage device in the communication network may access a device that performs the embodiments of the disclosure.

In the disclosure, the term 'computer program product' or 'computer-readable recording medium' is used to generally indicate a medium such as a memory, a hard disc installed in a hard disc drive, and a signal. The computer program product or computer-readable recording medium is a means provided for the method of transmitting or receiving signals in a wireless communication system according to the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure, which have been provided only for illustrative purposes. Furthermore, the embodiments may be operated by being combined with one another if necessary. For example, an embodiment of the disclosure and some of another embodiment of the disclosure may be combined to operate the BS and the UE. The embodiments of the disclosure may be equally applied to other communication systems, and other modifications of the embodiments may also be made without departing from the scope of the disclosure. For example, the embodiments of the disclosure may also be applied to an LTE system, 5G, an NR system, a 6G system, etc.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device in a wireless communication system, the electronic device comprising:
   a transceiver; and
   at least one processor,
   wherein the transceiver comprises an antenna module and a metasurface module,
   wherein the antenna module comprises a plurality of antennas,
   wherein the at least one processor is configured to
   generate first beams for the plurality of antennas,
   transmit the first beams to the metasurface module from the plurality of antennas,
   generate second beams based on the first beams through the metasurface module, and
   transmit the second beams to another electronic device, and
   wherein the metasurface module is arranged to receive the first beams generated for the plurality of antennas.

2. The electronic device of claim 1, wherein the plurality of antennas is arranged to be parallel to the metasurface module, and
   wherein distances from the plurality of antennas to a center of the metasurface module are different.

3. The electronic device of claim 1, wherein the plurality of antennas is arranged in a circle with respect to the metasurface module, and
   wherein distances from the plurality of antennas to a center of the metasurface module are equal.

4. The electronic device of claim 1, wherein the metasurface module comprises a plurality of unit cells,
   wherein each of the plurality of antennas comprises a plurality of antenna elements, and
   wherein a gap between the plurality of unit cells is determined based on at least one of a gap between the plurality of antennas or a gap between the plurality of antenna elements.

5. The electronic device of claim 1, wherein the metasurface module comprises a metasurface.

6. The electronic device of claim 1, wherein a size of the metasurface module is larger than a threshold in relation to a region for the receiving of the first beams generated for the plurality of antennas.

7. The electronic device of claim 1, wherein the metasurface module comprises a plurality of unit cells,
   wherein each of the plurality of antennas comprises a plurality of antenna elements, and
   wherein a channel between the plurality of antennas and the metasurface module is determined based on an angle of departure (AoD) or an angle of arrival (AoA) determined between each of the plurality of antenna elements and each of the plurality of unit cells, and a distance between each of the plurality of antenna elements and each of a plurality of unit cells.

8. The electronic device of claim 7, wherein radiation patterns of the plurality of antenna elements are determined based on the AoD or the AoA, and
   wherein a channel between the plurality of antennas and the metasurface module is determined based on the radiation patterns of the plurality of antenna elements.

9. An operating method of an electronic device in a wireless communication system, the operating method comprising:
   generating first beams for a plurality of antennas;
   transmitting the first beams to a metasurface module from the plurality of antennas;
   generating second beams based on the first beams through the metasurface module; and
   transmitting the second beams to another electronic device,
   wherein the metasurface module is arranged to receive the first beams generated for the plurality of antennas.

10. The operating method of claim 9, wherein the plurality of antennas is arranged to be parallel to the metasurface module, and
    wherein distances from the plurality of antennas to a center of the metasurface module are different.

11. The operating method of claim 9, wherein the plurality of antennas is arranged in a circle with respect to the metasurface module, and
    wherein distances from the plurality of antennas to a center of the metasurface module are equal.

12. The operating method of claim 9, wherein the metasurface module comprises a plurality of unit cells,
    wherein each of the plurality of antennas comprises a plurality of antenna elements, and
    wherein a gap between the plurality of unit cells is determined based on at least one of a gap between the plurality of antennas or a gap between the plurality of antenna elements.

13. The operating method of claim 9, wherein the metasurface module comprises a metasurface.

14. The operating method of claim 9, wherein a size of the metasurface module is larger than a threshold in relation to a region for the receiving of the first beams generated for the plurality of antennas.

15. The operating method of claim 9, wherein the metasurface module comprises a plurality of unit cells,
   wherein each of the plurality of antennas comprises a plurality of antenna elements, and
   wherein a channel between the plurality of antennas and the metasurface module is determined based on an angle of departure (AoD) or an angle of arrival (AoA) determined between each of the plurality of antenna elements and each of the plurality of unit cells, and a distance between each of the plurality of antenna elements and each of a plurality of unit cells.

16. The operating method of claim 15, wherein radiation patterns of the plurality of antenna elements are determined based on the AoD or the AoA, and
   wherein a channel between the plurality of antennas and the metasurface module is determined based on the radiation patterns of the plurality of antenna elements.

\* \* \* \* \*